United States Patent
Wang et al.

(10) Patent No.: US 8,010,303 B2
(45) Date of Patent: Aug. 30, 2011

(54) MULTI-GAS FLOW DEVICE

(75) Inventors: Chiun Wang, Cypress, CA (US); John M. Lull, Fullerton, CA (US); William S. Valentine, Irvine, CA (US)

(73) Assignee: Brooks Intrument, LLC, Hatfield, PA (US)

( * ) Notice: Subject to any disclaimer, the term of this patent is extended or adjusted under 35 U.S.C. 154(b) by 0 days.

(21) Appl. No.: 12/578,296

(22) Filed: Oct. 13, 2009

(65) Prior Publication Data

US 2010/0070206 A1   Mar. 18, 2010

Related U.S. Application Data

(62) Division of application No. 11/850,505, filed on Sep. 5, 2007, now Pat. No. 7,636,640.

(60) Provisional application No. 60/842,283, filed on Sep. 5, 2006.

(51) Int. Cl.
*G01F 1/00* (2006.01)
(52) U.S. Cl. ............ 702/45; 702/48; 702/52; 702/53
(58) Field of Classification Search .......... 702/45, 702/48, 52, 53; 374/135; 165/295; 137/87.01; 73/170.09, 170.19
See application file for complete search history.

(56) References Cited

U.S. PATENT DOCUMENTS

| | | | |
|---|---|---|---|
| 4,396,300 A | 8/1983 | Characklis et al. | |
| 5,260,865 A | 11/1993 | Beauford et al. | |
| 5,284,053 A * | 2/1994 | Wadlow et al. | 73/199 |
| 5,861,561 A | 1/1999 | Van Cleve et al. | |
| 5,911,238 A | 6/1999 | Bump et al. | |
| 5,944,048 A | 8/1999 | Bump et al. | |
| 5,975,126 A | 11/1999 | Bump et al. | |
| 6,561,218 B2 | 5/2003 | Mudd | |
| 6,575,027 B1 | 6/2003 | Larsen et al. | |
| 6,826,953 B2 | 12/2004 | Wang | |
| 6,962,164 B2 | 11/2005 | Lull et al. | |
| 7,000,463 B1 * | 2/2006 | Shajii et al. | 73/202.5 |
| 7,043,374 B2 | 5/2006 | Wang et al. | |
| 7,107,834 B2 * | 9/2006 | Meneghini et al. | 73/204.21 |
| 7,272,512 B2 | 9/2007 | Wang et al. | |
| 7,636,640 B2 * | 12/2009 | Wang et al. | 702/45 |
| 2002/0198668 A1 | 12/2002 | Lull | |
| 2004/0074311 A1 | 4/2004 | Lull | |

FOREIGN PATENT DOCUMENTS

EP   0834723   4/1998

OTHER PUBLICATIONS

Restriction Requirement date mailed Aug. 18, 2008 for U.S. Appl. No. 11/850,505.

(Continued)

*Primary Examiner* — Mohamed Charioui
*Assistant Examiner* — Elias Desta
(74) *Attorney, Agent, or Firm* — SNR Denton US LLP

(57) ABSTRACT

A system and method of characterizing or controlling a flow of a fluid is provided that involves a sensor conduit and a bypass. A plurality of fluids may be utilized in the flow control device based on characteristic information of the device generated during calibration thereof. The characteristic information, in turn is based on a dimensionless parameters, such as adjusted dynamic pressure and adjusted Reynolds number.

19 Claims, 9 Drawing Sheets

OTHER PUBLICATIONS

Response filed Sep. 17, 2008 for U.S. Appl. No. 11/850,505.
Non-Final Office Action date mailed Dec. 10, 2008 for U.S. Appl. No. 11/850,505.
Response filed Jun. 10, 2009 for U.S. Appl. No. 11/850,505.
Notice of Allowance date mailed Aug. 7, 2009 for U.S. Appl. No. 11/850,505.

Non-Final Office Action date mailed Oct. 28, 2010 for U.S. Appl. No. 12/578,276.
Ressponse filed Jan. 28, 2011 for U.S. Appl. No. 12/578,276.

* cited by examiner

MULTI-GAS FLOW DEVICE

CROSS-REFERENCE TO RELATED APPLICATIONS

This application is a Divisional application of application Ser. No. 11/850,505 now U.S. Pat. No. 7,636,640, filed on Sep. 5, 2007, entitled MULTI-GAS FLOW DEVICE, which claims the benefit of U.S. Provisional Application No. 60/842,283, filed on Sep. 5, 2006, entitled CALIBRATION OF A MULTIGAS FLOW DEVICE HAVING A NON-LINEAR BYPASS, the entire contents of which are incorporated herein by reference.

BACKGROUND OF THE INVENTION

1. Field of the Invention

The present invention relates to fluid flow sensors and controllers and more particularly to multi-gas flow sensors and control devices which may have non-linear bypass attributes.

2. Discussion of Related Art

Wang, in U.S. Pat. No. 6,826,953, discloses an apparatus and method for measuring flow. The flow sensor includes a sensor conduit and a bypass having at least one capillary tube. At least one of the length, inside diameter, and cross-sectional shape of the sensor conduit is substantially equal to the corresponding length, inside diameter, and cross-sectional shape of the at least one capillary tube.

Lull et al., in U.S. Pat. No. 6,962,164, disclose a system and method for controlling a mass flow controller to have a constant control loop gain under a variety of different types of fluids and operating conditions, and for configuring the mass flow controller for operation with a fluid and/or operating conditions different from those used during production of the mass flow controller. The system and method further facilitates control by reducing the effects of hysteresis in solenoid-actuated devices by providing a non-operational signal to the solenoid-actuated device.

Wang et al., in U.S. Pat. No. 7,043,374, disclose an apparatus and method of obtaining at least one representation of a characteristic function of a sensor from a test fluid during calibration, and of employing the at least one representation to determine flow rates through the sensor during operation with an arbitrary fluid.

SUMMARY OF THE INVENTION

According to one aspect of the invention, a flow sensor is provided. The flow sensor comprises a bypass with a plurality of bypass tubes; a sensor conduit in fluid communication with the bypass; a sensor assembly operatively coupled to the sensor conduit to generate a measured signal representative of a flow rate of a fluid through the sensor conduit; and a processor operatively configured to receive the measured signal and to generate a flow rate representation based at least partially on the measured signal and a characteristic function of the flow sensor, the characteristic function at least partially defined by a dynamic pressure of fluid flowing through the bypass.

In some embodiments of pertinent to this aspect of the invention, the characteristic function can be defined by a Reynolds number of the fluid flowing through the bypass. The characteristic function can be further defined by a ratio of the dynamic pressure to the pressure drop across the bypass. The characteristic function can be further defined by a product of the Reynolds number and an aspect ratio of the bypass. The characteristic function can also be further based on a bypass bias function that is at least partially based on an adjusted dynamic pressure of a fluid flowing through the bypass. The bypass bias function can be based on a ratio of dynamic pressure of a fluid flowing through the bypass relative to a measured dynamic pressure of a calibration gas flowing through the bypass. The bypass bias function can be further based on a ratio of a pressure drop of the fluid flowing through the flow sensor to a measured pressure drop of the calibration gas flowing through the flow sensor. The bypass bias function can be at least partially defined by a polynomial function, $F_B=(a_0+a_1X+a_2X^2+a_3X^3)$, wherein $a_0$, $a_1$, $a_2$, and $a_3$ are bypass bias function coefficients defined during flow of the calibration gas through the flow sensor and X is a product of the Reynolds number of the fluid flowing through the bypass and a ratio of the inside diameter to the length of the bypass tubes. The flow sensor can further comprise a storage device operatively coupled to the circuit and comprising a plurality of bypass bias coefficients. The characteristic function can be at least partially based on the dimensionless number:

$$\text{Re}\left(\frac{D}{L}\right) = \frac{\rho U D}{\mu}\left(\frac{D}{L}\right),$$

where Re is a Reynolds number of the fluid flowing through the bypass, $\rho$ is the density of the fluid, $\mu$ is the viscosity of the fluid, U is the mean velocity of the fluid flowing through the bypass, D is the inside diameter of the bypass tubes, and L is the bypass tube length. The characteristic function, in some cases, defines calibration curve defined by the relationship:

$$\frac{Q}{\Delta P} = G\left(\text{Re}\frac{D}{L}\right),$$

$$\text{where } Q = \frac{1}{2}(\rho U^2)$$

and $\Delta P$ is the pressure drop across the flow sensor. The calibration curve can be defined by the relationship:

$$\left(\frac{Q}{\Delta P}\right)_f = \left(\frac{Q}{\Delta P}\right)_c \cdot F_B,$$

where the bypass bias function is $F_B=(a_0+a_1X+a_2X^2+a_3X^3)$, and $a_0$, $a_1$, $a_2$, and $a_3$ are bypass bias function coefficients defined using a calibration gas and the subscripts f and c respectively denote values corresponding to the fluid and the calibration gas.

According to another aspect of the invention, a method of determining a flow rate of a fluid is provided. The method comprises providing a flow sensor comprising a bypass with a plurality of bypass tubes, a sensor conduit in fluid communication with the bypass; generating a measured signal representative of a flow rate of a fluid through the sensor conduit; accessing characteristic information generated during calibration of the flow sensor at a plurality of flow rates with at least one calibration fluid, the characteristic information including a plurality of first dimensionless parameters based on a dynamic pressure of each of the plurality of flow rates and a corresponding plurality of second dimensionless parameters based on a Reynolds number of each of the plurality of flow rates; and generating a representation of the flow rate of the fluid through the flow sensor based at least partially on the measured signal and on the characteristic information.

In some embodiments of pertinent to this aspect of the invention, the characteristic information can be at least partially defined by a characteristic function:

$$\frac{Q}{\Delta P} = G\left(\text{Re}\frac{D}{L}\right),$$

where Q is a bypass dynamic pressure determined during calibration with the at least one calibration fluid, ΔP is a pressure differential across the flow sensor determined during calibration, Re is a Reynolds number through the bypass determined during calibration, D is the inside diameter of the bypass tubes, and L is the bypass tube length. The fluid is typically not any of the calibration fluids utilized during calibration of the flow sensor. The characteristic function can be based at least partially on a bypass bias function defined by the relationship:

$$F_B = (a_0 + a_1 X + a_2 X^2 + a_3 X^3),$$

where $$X = \text{Re}\frac{D}{L},$$

and where $a_0$, $a_1$, $a_2$, and $a_3$ are bypass bias function coefficients defined during calibration of the flow sensor.

According to still another aspect of the invention, a fluid flow controller is provided. The fluid flow controller comprises a flow sensor comprising a bypass with a plurality of bypass tubes, a sensor conduit in fluid communication with the bypass, a sensor assembly operatively coupled to the sensor conduit to generate a measured signal representative of a flow rate of a fluid through the sensor conduit; a processor operatively configured to receive the measured signal and to generate a flow rate representation based at least partially on the measured signal and a characteristic function of the flow sensor, the characteristic function at least partially defined by a dynamic pressure of fluid flowing through the bypass; and a flow regulator fluidly connected to the flow sensor and configured to receive a control signal from the processor that is at least partially based on the flow rate representation and a desired fluid flow.

In some embodiments of pertinent to this aspect of the invention, the characteristic function can be represented by a relationship defined during calibration of the sensor at a plurality of flow rates with at least one calibration fluid:

$$\frac{Q}{\Delta P} = G\left(\text{Re}\frac{D}{L}\right),$$

where Q is a dynamic pressure of a bypass of the flow sensor, ΔP is the overall pressure differential, Re is a Reynolds number of the fluid flowing through the bypass, D is the inside diameter of bypass tubes in the bypass, and L is the length of the bypass tubes. The characteristic function can be further based on a bypass bias function, $F_B$, defined by the relationship:

$$F_B = (a_0 + a_1 X + a_2 X^2 + a_3 X^3),$$

where $$X = \text{Re}\frac{D}{L},$$

and where $a_0$, $a_1$, $a_2$, and $a_3$ are bypass bias function coefficients defined using at least one calibration fluid during calibration of the flow controller.

According to one or more aspects of the invention, a method of controlling a flow rate of a fluid through a flow controller comprising a control valve and a flow sensor, the flow sensor having a bypass that includes a plurality of bypass tubes, and a sensor conduit fluidly connected to the bypass, is provided. The method comprises generating a measured signal representative of a flow rate of the fluid through the sensor conduit; and generating a representation of the flow rate of the fluid through the flow sensor based at least partially on the measured signal, one or more sensor attributes, one or more fluid properties, and a characteristic function according to the relationship:

$$\frac{Q}{\Delta P} G\left(\text{Re}\frac{D}{L}\right)$$

where Q is a bypass dynamic pressure, ΔP is the overall pressure differential, Re is a Reynolds number of the fluid flowing through the bypass, D is the inside diameter of the bypass tubes, and L is the length of the tubes; and adjusting a flow rate of the fluid through a control valve based at least partially on the representation of the flow rate of the fluid and a desired flow rate through the flow controller.

In some embodiments of pertinent to this aspect of the invention, the characteristic function can further be based on a bypass bias function, $F_B$, defined by the relationship:

$$F_B = (a_0 + a_1 X + a_2 X^2 + a_3 X^3),$$

where $$X = Re\frac{D}{L},$$

and where $a_0$, $a_1$, $a_2$, and $a_3$ are bypass bias function coefficients defined using at least one calibration fluid during calibration of the flow controller. The fluid is typically not a calibration fluid utilized to generate the characteristic function.

According to yet another aspect of the invention, a method of generating a characteristic function for a flow sensor having a bypass that includes a plurality of bypass tubes is provided. The method comprises measuring a plurality of flow rates of a calibration fluid flowing through the flow sensor, generating a plurality of adjusted dynamic pressure attributes corresponding to each of the plurality of measured flow rates of the calibration fluid, and generating the characteristic function based at least partially on the plurality of adjusted dynamic pressure attributes and at least one physical attribute of the flow sensor.

In some embodiments of pertinent to this aspect of the invention, the act of generating the plurality of adjusted dynamic pressure attributes can comprise measuring a pressure differential across the flow sensor for each of the plurality of flow rates and generating a plurality of dynamic pressure values for each of the plurality of flow rates. The act of generating the plurality of adjusted dynamic pressure attributes, $(Np)_i$, can comprise calculating, for each of the plurality of flow rates, $$(Np)_i = \frac{\frac{1}{2}(\rho U^2)}{\Delta P},$$

where $\Delta P$ is the pressure differential across the flow sensor of the calibration fluid, $\rho$ is the density of the calibration fluid, and U is the mean velocity of the calibration fluid flowing through the bypass. The method can further comprise generating a plurality of adjusted flow attributes corresponding to each of the plurality measured flow rates of the calibration fluid. The act of generating the plurality of adjusted flow attributes, $(Nf)_i$, can comprise calculating, for each of the plurality of flow rates, the function:

$$(Nf)_i = Re\frac{D}{L},$$

where Re is a Reynolds number of the fluid flowing through the bypass, D is the inside diameter of the bypass tubes, and L is the bypass tube length. The method can further comprise measuring a plurality of output values corresponding to the plurality of flow rates of the calibration fluid. The method can further comprise generating a calibration curve based on the plurality of output values and the characteristic function. The characteristic function can be defined by the relationship:

$$\frac{Q}{\Delta P} = G\left(Re\frac{D}{L}\right)$$

where Q is the bypass dynamic pressure, $Q=0.5(\rho U^2)$ $\Delta P$ is a pressure differential across the flow sensor, $\rho$ is the density of the calibration fluid, and U is the mean velocity of the calibration fluid flowing through the bypass, Re is a Reynolds number of the fluid flowing through the bypass, D is the inside diameter of the bypass tubes, and L is the bypass tube length.

According to another further aspect of the invention, a method of generating a calibration curve for a flow sensor that includes at least one bypass tube is provided. The method comprises introducing a calibration gas into the flow sensor at a plurality of flow rates; determining a first dimensionless parameter based at least partially on a dynamic pressure value of the calibration gas flowing through the bypass for each of the plurality of flow rates; determining second dimensionless parameter based at least partially on a diameter to length aspect ratio of the bypass for each of the plurality of flow rates; and mapping the first dimensionless parameter as a function of the second dimensionless parameter.

In some embodiments of pertinent to this aspect of the invention, the first dimensionless parameter can be defined by the ratio of the product of one half of the density of the calibration gas and the square of the mean flow velocity to the measured overall pressure differential. The second dimensionless parameter can be defined by a product of the Reynolds number of the calibration gas flowing through the bypass and the aspect ratio of the bypass. The method can further comprise determining a plurality of first and second dimensionless numbers corresponding to each of the plurality of flow rates, and mapping each of the corresponding first and second dimensionless numbers to generate a calibration curve. The method can further comprise generating a bypass bias function based on the plurality of corresponding first and second dimensionless numbers.

According to still another aspect of the invention, a computer readable medium is provided. The computer readable medium is encoded with a program for execution on at least one processor, the program, when executed on the at least one processor, performing a method of regulating a flow of fluid through a flow controller that includes a flow sensor having a sensor conduit and a bypass having a plurality of bypass tubes, and a control valve fluidly connected to the flow sensor, the method comprising receiving, as an input, a sensor output value representative of a flow rate of the fluid through the sensor conduit; generating a representation of the flow rate of the fluid through the flow sensor based at least partially on the sensor output value, one or more flow sensor attributes, one or more fluid properties, and a characteristic function represented by the relationship:

$$\frac{Q}{\Delta P} = G\left(Re\frac{D}{L}\right);$$

and
adjusting a flow rate of the fluid through the control valve based at least partially on the representation of the flow rate of the fluid and a desired flow rate through the flow controller, where Q is a dynamic pressure of a bypass of the flow sensor, $\Delta P$ is the overall pressure differential, Re is a Reynolds number of the fluid flowing through the bypass, D is the inside diameter of bypass tubes in the bypass, and L is the length of the bypass tubes. The characteristic function may be further based on a bypass bias function, $F_B$, defined by the relationship:

$$F_B = (a_0 + a_1 X + a_2 X^2 + a_3 X^3),$$

where $$X = Re\frac{D}{L},$$

and where $a_0$, $a_1$, $a_2$, and $a_3$ are bypass bias function coefficients defined using at least one calibration fluid during calibration of the flow controller.

According to yet still another aspect of the invention, a method of facilitating flow control is provided. The method comprises providing a computer readable medium adapted to store information comprising an encoding of at least one characteristic function of a flow sensor obtained during calibration thereof with at least one calibration fluid, wherein the flow sensor comprises a sensor conduit and a bypass that includes a plurality of bypass tubes, and the at least one characteristic function is at least partially defined by a relationship comprising a plurality of dimensionless dynamic pressure attributes and corresponding dimensionless flow attributes. The characteristic function is at least partially defined by the relationship:

$$\frac{Q}{\Delta P} = G\left(Re\frac{D}{L}\right),$$

where Q is a bypass dynamic pressure determined during calibration with the at least one calibration fluid, $\Delta P$ is a pressure differential across the flow sensor determined during calibration, Re is a Reynolds number through the bypass determined during calibration, D is the inside diameter of the bypass tubes, and L is the bypass tube length. The characteristic function may be further based on a bypass bias function, $F_B$, that is defined by the relationship:

$$F_B = (a_0 + a_1 X + a_2 X^2 + a_3 X^3),$$

where $$X = Re \frac{D}{L},$$

and where $a_0$, $a_1$, $a_2$, and $a_3$ are bypass bias function coefficients defined during calibration of the sensor.

According to one or more aspects of the invention, a computer readable medium encoded with at least one characteristic function of a flow sensor obtained during calibration thereof with at least one calibration fluid is provided. The flow sensor comprises a sensor conduit and a bypass that includes a plurality of bypass tubes. The at least one characteristic function is at least partially defined by a relationship comprising a plurality of dimensionless dynamic pressure attributes and corresponding dimensionless flow attributes. In particular, the characteristic function is at least partially defined by the relationship:

$$\frac{Q}{\Delta P} = G\left(Re \frac{D}{L}\right),$$

where Q is a bypass dynamic pressure determined during calibration with the at least one calibration fluid, $\Delta P$ is a pressure differential across the flow sensor determined during calibration, Re is a Reynolds number through the bypass determined during calibration, D is the inside diameter of the bypass tubes, and L is the bypass tube length. In still preferred embodiments pertinent to this aspect of the invention, the characteristic function is based on a bypass bias function, $F_B$, that is defined by the relationship:

$$F_B = (a_0 + a_1 X + a_2 X^2 + a_3 X^3),$$

where $$X = Re \frac{D}{L},$$

and where $a_0$, $a_1$, $a_2$, and $a_3$ are bypass bias function coefficients defined during calibration of the flow sensor.

BRIEF DESCRIPTION OF THE DRAWINGS

The accompanying figures are not intended to be drawn to scale. In the drawings, each identical or nearly identical component that is illustrated in various figures is represented by a like reference numeral or symbol. For purposes of clarity, not every component may be labeled in every drawing. In the drawings.

DETAILED DESCRIPTION

Figure 1:
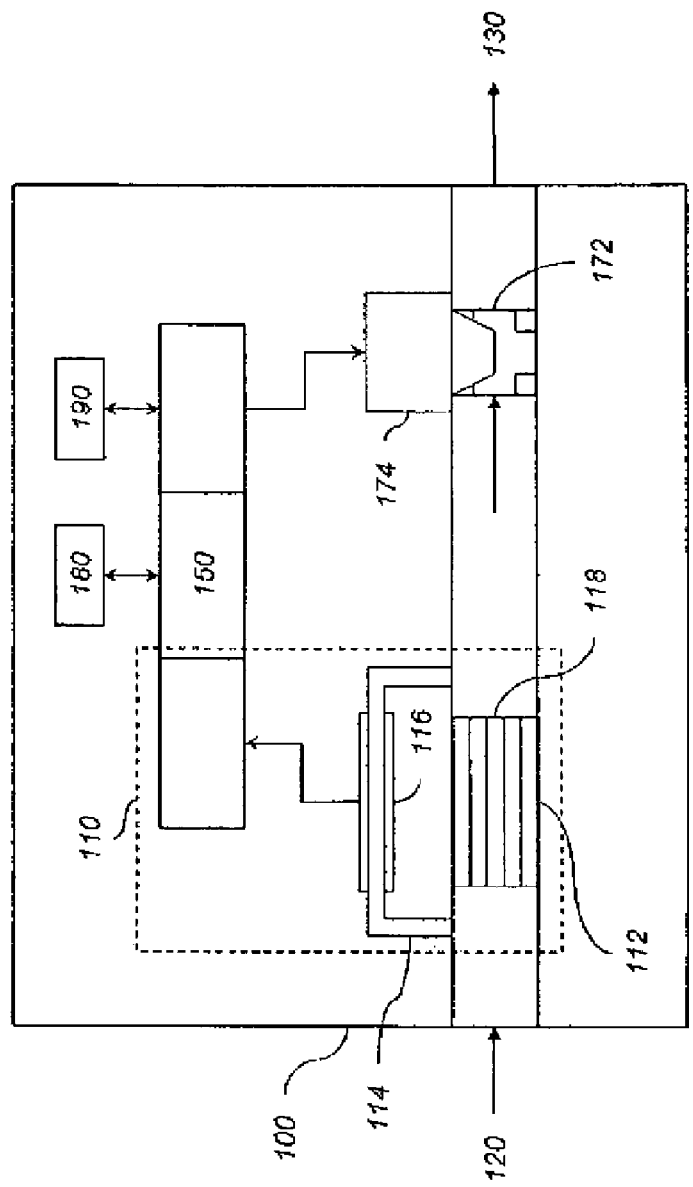
FIG. 1 is a schematic diagram of one embodiment of a fluid flow control device according to one or more aspects of the invention.

Various embodiments and aspects thereof will now be discussed in detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Examples of specific implementations are provided herein for illustrative purposes only. In particular, acts, elements and features discussed in connection with one embodiment are not intended to be excluded from a similar role in other embodiments. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various embodiments of the present invention include a method and apparatus for monitoring and closed-loop-control of a flow of fluids. In accordance with one or more aspects of the invention, the fluids being monitored and controlled may be directed to a semiconductor production system. However, the invention is not limited to the field of semiconductor manufacturing and the principles of the invention described herein may be applied to monitor and control fluid flow in a variety of technological fields. For example, the inventive systems disclosed herein may be used in synthesizing operations for pharmaceutical products.

According to some embodiments, there are provided process-transparent (i.e., can be used with any type of process)

technologies for use at process tools that provide real-time measurements of fluid chemical concentration and/or flow rate. These technologies have significant applications in monitoring and control systems, including point-of-use blending and delivery, for all fluids-based process areas, including, but not limited to, semiconductor manufacturing.

In some cases, the invention can provide flow sensors that can provide flow rate information for a plurality of fluids. Further aspects of the invention can involve flow controllers that can regulate, maintain or otherwise provide a particular, desired, or target flow rate for any of a plurality of fluids by utilizing characteristic information of the flow control device. Some further aspects relate to calibration information for flow sensors or flow control devices suitable for a plurality of process gases. For example, a particularly advantageous aspect of the invention can involve characteristic information, such as a characteristic function pertinent to a calibration relationship for the device that is derived from one or more known, surrogate or test fluids and be applicable to other fluids. Thus, one or more aspects of the invention can provide fluid-independent characteristic information and be advantageously suitable for controlling a flow rate of various fluids or providing flow rate information of various fluids, including fluids not involved in generating the characterization information.

FIG. 1 shows a flow control device 100 having at a fluid inlet 120 and a fluid outlet 130 in accordance with one or more aspects of the invention. Flow control device 100 can comprise one or more sensor assemblies 110 including a bypass 112 and a sensor conduit 114 fluidly connected to the bypass 112. The bypass can comprise a plurality of capillary tubes 118 that serve to at least partially render a laminar flow character. One or more sensors 116 is typically operatively disposed or configured to provide a representation of a flow rate of fluid flowing through the sensor conduit 114. Typically, during operation, a fluid, such as a gas, is introduced into the device 100. A portion of the fluid flows through the bypass 112 and a portion of the fluid flows through the sensor conduit 114. Typically, the portion of fluid flowing through the sensor conduit 114 is a fraction of the portion of fluid flowing through the bypass 112. The total flow rate through the device is thus a summation of the flow rates through the bypass and the sensor conduit.

When the fluid flows through the sensor conduit 114 at a particular flow rate, a corresponding measured sensor output signal is generated by the one or more sensors or sensor assemblies 116 along with an associated, distinctive pressure drop or pressure differential, $\Delta P$, across the bypass 112.

Flow control device 100 typically has a flow regulator or assembly that limits the rate or amount of fluid flowing therethrough to a target or desired, typically predetermined value. For example, flow control device 100 can comprise a valve 172 in fluid communication with the sensor assembly 110, which can be downstream or upstream thereof. Preferred embodiments of the flow control device 100 includes one or more processors 150 typically configured to receive information representative of the flow through the sensor conduit 114 from sensor 116, which can be a mass flow meter. The one or more control systems of processors 150 can be operatively coupled and/or configured to, for example, exchange data with one or more data storage devices 180 and one or more peripheral devices 190. For example, data storage device 180 can be a memory system that stores information pertinent to the physical configuration of the flow control device 100 and the one or more peripheral devices 190 can be an output device configured to present any information concerning to the operation of the flow control device 100. Further preferred embodiments of the invention can involve flow control devices that comprise one or more processors configured to generate a control or drive signal that energizes or de-energizes an actuator 174 that is operatively coupled to flow regulator 172 thereby providing or establishing, for example, a control loop.

Figure 2:
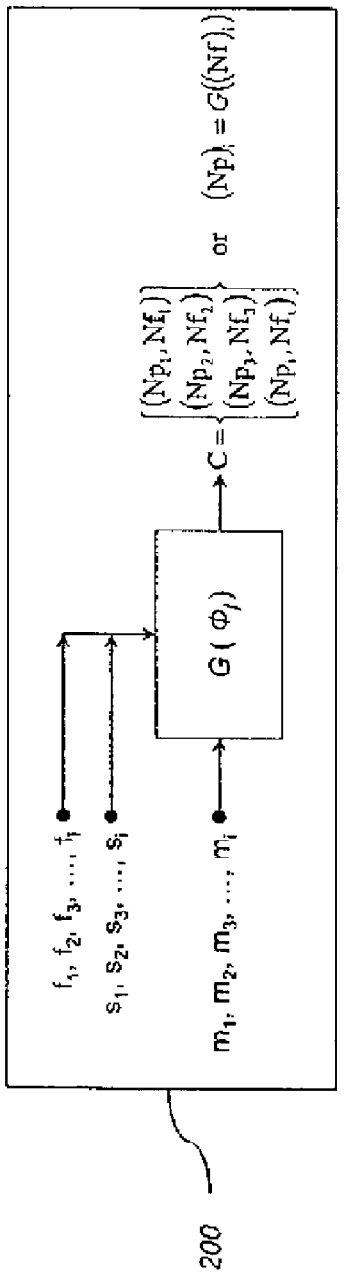
FIG. 2 is a diagram schematically illustrating a sensor model in accordance with one or more aspects of the invention.

FIG. 2 illustrates a model 200 for generating characteristic information of the sensor that utilizes at least one property or attribute $(f_1, f_2, f_3, \ldots, f_i)$ of one or more fluids, which is typically the one or more gases used during calibration, such as density and viscosity; at least one sensor physical property or attribute $(s_1, s_2, s_3, \ldots, s_i)$, such as the diameter, the number of tubes, the length of the tubes, and, in some cases, the ratio of the sensor conduit flow to the bypass flow; and at least one measured value $(m_1, m_2, m_3, \ldots, m_i)$ obtained during calibration in accordance with some embodiments of the invention. The received or input information is transformed into the characteristic information represented as a characteristic function (C) according to the relationship $(Np)_i=G((Nf)_i)$. Typically, a plurality of corresponding pairs of the dimensionless parameters, $(Np, Nf)_i$, are generated which can then be mapped as a characteristic function.

Figure 3:
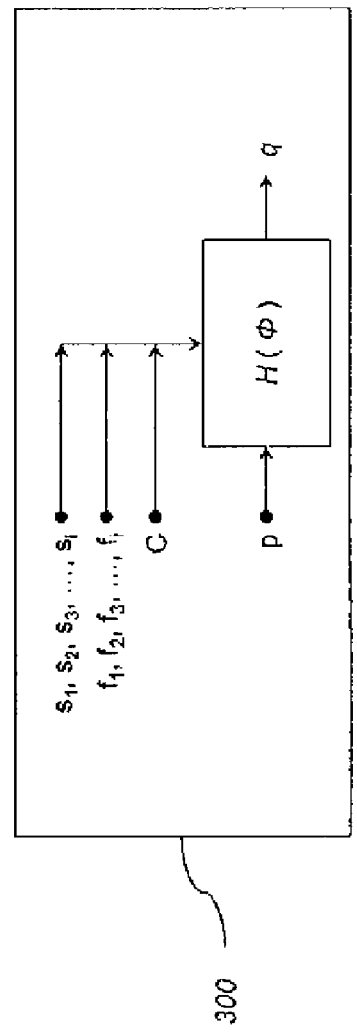
FIG. 3 is a diagram schematically illustrating a flow control model in accordance with one or more aspects of the invention.

The characteristic function can then be used to generate a calibration curve for a process gas and be implemented in a control model 300 as illustrated in FIG. 3. The control model typically utilizes at least one process gas property $(f_1, f_2, f_3, \ldots, f_i)$ and at least one sensor property $(s_1, s_2, s_3, \ldots, s_i)$ along with the characteristic function (C), and, optionally a flow set point, to generate a drive control signal that results in the desired flow rate of process gas through, for example, the flow control device.

Various techniques for measuring a flow rate of a flied flowing in a conduit, pipe or tube, including, for example, thermal flow meters, coriolis force flow meters, and differential pressure flow meters, may be utilized in one or more embodiments of the invention. Thus, although the data presented herein involve thermal mass flow meters, the invention may be practiced to utilise other types of flow meters. It is also known to incorporate these and other types of flow meters in feedback control loops so as to control the flow of a fluid in a system. Stated another way, the flow sensor and flow control devices of the invention can utilize one or more flow meters, any of which can include one or more mass flow meters as well as one or more flow meters that do not rely on thermally monitoring the fluid behavior. Flow sensors and flow controllers typically utilize a bypass and a sensor conduit, at least for moderate and larger flow rates.

The bypass typically divides the flow so that a small fraction of the total fluid flow passes through the sensor conduit. The bypass may consist of one or more laminar flow elements, such as bundles of capillary tubes, chunks of porous material, sintered or unsintered screens, or honey-comb type of structures. The sensor conduit typically has a limited range of flow measurement.

Figure 4:
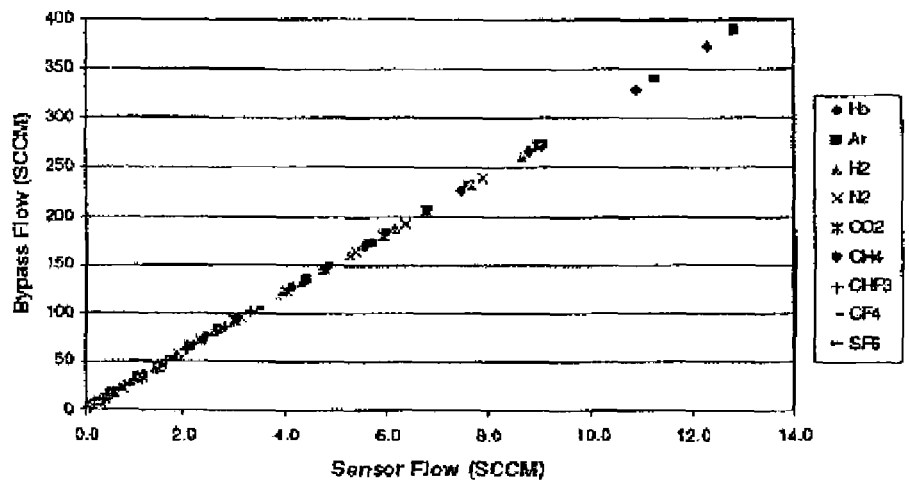
FIG. 4 is a graph showing a linear bypass flow to sensor flow relationship for a flow sensor or flow controller.

At low flow rates, below about 10 sccm, the mass flow controller can accurately provide a desired total flow rate, typically without a bypass. At low to medium flow rates, from about 10 sccm to about 5 slm, a bypass is typically utilized with a plurality of thin long capillary tubes with a relatively large L/D aspect ratio to linearly divide the fluid flow. For such non-low flow rate mass flow controllers, the bypass flow, when considered relative to the sensor flow rate, can be linearly represented relative to the sensor flow rate as illustrated in FIG. 4. The linear relationship has a constant slope, the bypass factor (BPF), which can be characterized as the ratio of the bypass flow rate to the sensor flow rate, i.e., $$BPF = \frac{|(BypassFlow)|}{|(\text{Sensor Flow})|} \quad (1)$$

For mass flow controllers with linear sensor to bypass relationships, the bypass factor is essentially a constant value for all fluids.

Because the BPF in linear relationship devices does not change from gas to gas for low to medium flow mass flow rates, once the flow is given, the flow through the bypass may be calculated by multiplying the sensor flow rate by the bypass factor BPF. The total flow is thus a straightforward summation of both values.

For the low to medium flow rate devices with linear bypass to sensor conduit flow relationships, accurate bypass flow for any process gas may be readily calculated by multiplying the sensor flow rate with the constant bypass factor BPF. Calibration of low to medium flow devices typically involves determining the bypass factor BPF from the calibration data generated with a preferably inert calibration gas, such as nitrogen. To generate flow rate information, the measured process gas sensor flow rate is multiplied by the BPF to obtain the corresponding process gas bypass flow rate. The total flow rate is the sum of the measured sensor flow rate and the calculated bypass flow rate.

For example, the total flow in a flow control device is equal to the sum of the calculated bypass flow and the measured sensor flow as represented by:

$$BypassFlow = (TotalFlow)_{cg} - (SensorFlow)_{cg} \quad (2)$$

where the subscript "cg" stands for calibration gas.

With the sensor flow versus sensor-output relationship for the calibration-gas determined during the sensor calibration, which is separately determined, the bypass factor may be determined by dividing the bypass flow rate by the sensor flow rate according to:

$$BPF = \frac{|(TotalFlow - SensorFlow)_{cg}|}{(\text{Sensor Flow})_{cg}} \quad (3)$$

For a linear bypass device, the bypass factor is a constant. The bypass flow rate for any process gas through the device at the same sensor output value may therefore be accurately determined by multiplying the process gas ("pg") sensor flow value with the bypass factor according to:

$$(BypassFlow)_{pg} = BPF^*(SensorFlow)_{pg} \quad (4)$$

where the process gas sensor flow $(SensorFlow)_{pg}$ can be determined either through prior sensor calibration or through the use of an established mathematical model. A non-limiting example of a model that can be utilized is disclosed by Wang et al., in U.S. Pat. No. 7,043,374, which is incorporated herein by reference in its entirety for all purposes. The total process gas flow rate may be determined by adding the sensor flow value to the bypass flow value:

$$(TotalFlow)_{pg} = (BypassFlow)_{pg} + (SensorFlow)_{pg} \quad (5)$$

At higher flow rates, the bypass can involve capillary tubes with relatively large inside diameters and relatively small aspect ratios, L/D. These configurations are adopted because the flow capacity of linear bypass devices is typically insufficient for the flow rate requirement. The bypass flow to sensor flow characteristics curves for the bypasses in these higher flow rate flow control devices are distinctly non-linear such that the bypass factor is not a constant but is typically a function of the flow rate and, in some cases, the fluid species.

Figure 5:
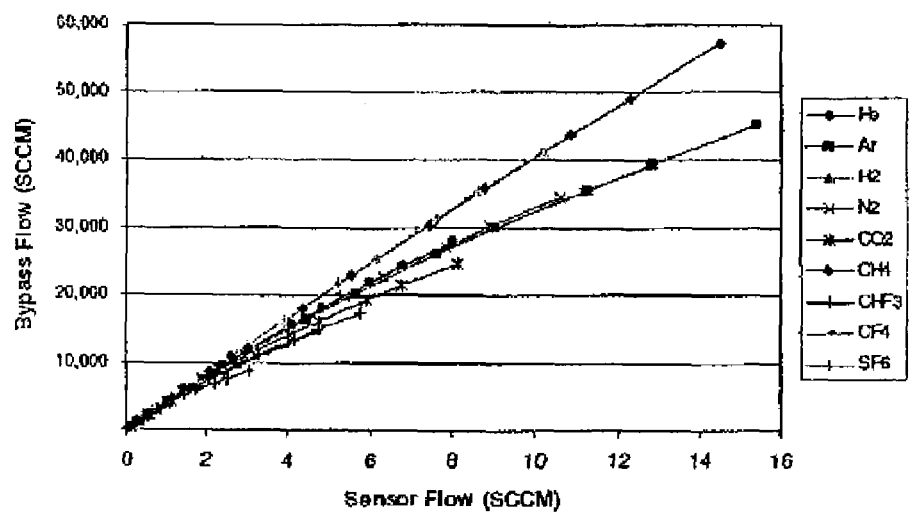
FIG. 5 is a graph showing bypass flow to sensor flow characteristic functions in high flow rate devices.

The bypass flow and sensor flow characteristic functions or curves for a high flow rate flow control device with a nonlinear bypass are shown in FIG. 5. Relationships for various gases are illustrated for comparative purposes. The full-scale flow range for the flow control device in FIG. 5 is gas dependent, and is about 30,000 sccm for nitrogen, $N_2$. As shown in FIG. 5, the bypass flow rate to the sensor flow rate relationship for this device differs from the flow control device with a linear bypass to sensor flow rate relationship depicted in FIG. 4. Indeed, instead of a single linear relationship, a plurality of relationships can be involved for each of the different fluids. Further, the non-linear relationship i.e., the shape of the curve, changes from gas to gas and the slope of each of the various curves is a function of the flow rate. The present invention, in some aspects, can advantageously rationalize the differences in relationships for non-linear bypass flow rate to sensor conduit flow rates.

High flow rate flow control devices are typically calibrated with multiple surrogate gases to generate a plurality of calibration curves. Calibration information is used if the device is placed in service with a process gas used during the calibration process. If, however, calibration operations did not include a particular process gas, then one of the available calibration curves corresponding to one of the surrogate gases is empirically appointed to mimic the process gas calibration characteristics. The empirically-based selection of the surrogate gas is frequently based on intuition and may lack sufficiently acceptable correlative justification.

For example, when the flow rate of an un-calibrated gas is sensed or controlled by a flow control device that has been calibrated with surrogate gases He, Ar, $H_2$, $N_2$, $CO_2$, $CH_4$, $CHF_3$, $CF_4$, and $SF_6$ having the characteristic functions shown in FIG. 5, one of the available calibration curves would be utilized to mimic the unknown process gas. The selection of a surrogate gas for characteristic information, however, is empirically determined which can lead to significant and unacceptable error.

The present invention provides an accurate bypass flow rate model based on dimensionless parameters. Some particularly advantageous aspects of the invention involve techniques for data correlation, model construction, and model correction that are formulated in terms of dimensionless quantities or parameters. For example, the inventive techniques can generate accurate calibration curves for multi-gas flow sensors or control devices, without requiring a priori calibration with any of the multiple process gases.

In accordance with one or more aspects of the invention, the bypass flow data can be represented in terms of one or more dimensionless quantities or parameters. The dimensionless parameters can be indicative of a flow characteristic or an energy characteristic of the fluid. For example, particularly advantageous aspects of the invention can involve bypass flow rate information that is at least partially based on one or more viscous properties, one or more kinematic or dynamic properties, or even one or more intrinsic properties the flowing fluid. Any one or more of the dimensionless parameters may be used to further provide characteristic information for the sensor or the flow control device. Moreover, further aspects of the invention can involve characteristic information for the device generated utilizing any of the dimensionless parameters.

In accordance with further particular aspects of the invention, characteristic information can be generated, represented, or based on the dynamic nature of fluid flowing through the device. In accordance with further particular aspects of the invention, characteristic information can be generated, represented, or based on the inertial nature of fluid flowing through the device. In accordance with still further aspects of the invention, characteristic information can be generated, represented, or based on the physical or configurational information of the device. In accordance with still further aspects of the invention, characteristic information can be generated, represented, or based on the kinetic energy as well as the inertial and viscous nature of the fluid flowing through the device.

For example, characteristic information can be used in generating a characteristic function based on the fluid dynamic pressure in the bypass, Q, defined as $$Q = \frac{1}{2}\rho U^2 \quad (6)$$

where $\rho$ is the fluid density and U is the mean bypass fluid flow rate.

In some particular aspects of the invention, the fluid dynamic pressure may be represented or utilized as a dimensionless parameter by rationalizing, normalizing or adjusting for applied forces. For example, the dynamic pressure may be adjusted or rationalized relative to a pressure differential thereby providing a dimensionless parameter that can be advantageously involved as part of the characteristic information.

In some cases, characteristic information can be used in generating a characteristic function that is further based on the dimensionless parameter of the bypass flow, such as the Reynolds number, Re, which is a ratio of the inertial forces and viscous forces of the fluid, and defined as:

$$Re = \frac{\rho U D}{\mu} \quad (7)$$

where $\rho$ is the fluid density, $\mu$ is the fluid viscosity, and D is the inside diameter of the bypass tubes used to form the bypass.

Further advantageous embodiments can involve adjusted or rationalized dimensionless parameters related to the fluid flow. For example, the Reynolds number can be adjusted by an aspect ratio of the flow channel. Thus, one or more embodiments of the invention can involve characteristic information as represented by a characteristic function that is based on the dimensionless parameter, Q/$\Delta$P, and on a second dimensionless parameter, Re(D/L), where L is the bypass tube length. Particularly advantageous embodiments of the invention can be represented according to the relationship:

$$\frac{Q}{\Delta P} = G\left(Re\frac{D}{L}\right) \quad (8)$$

Since the overall pressure drop, $\Delta$P, the bypass flow mean velocity, U, the gas density, $\rho$, the gas viscosity, $\mu$, and the characteristic bypass tube length, L, and the bypass tube inside diameter, D, are the only physical quantities governing the problem, dimensional analysis, and in particular Buckingham's $\Pi$ theorem, assures that the physical problem may be simplified to one governed by exactly three mutually independent non-dimensional quantities, chosen here to be [Q/$\Delta$P], [ReD/L], and [D/L].

For a multi-gas flow control device with a bypass consisting of round tubes with fixed geometrical factor, D/L, only two independent non-dimensional quantities remain, Np=Q/$\Delta$P and Nf=ReD/L. These two quantities can sufficiently delineate the entire physical problem. Further implications from dimensional analysis are: 1) any other non-dimensional quantities associated with this physical problem may always be expressed as algebraic combinations of these two quantities; and 2) since there are only two governing dimensionless variables in this problem, a unique functional relationship can be used between these variables. Dimensional analysis theories provide that these rules should stand regardless of the volumetric flow rate or the fluid properties of the individual gas species under investigation.

Figure 6:
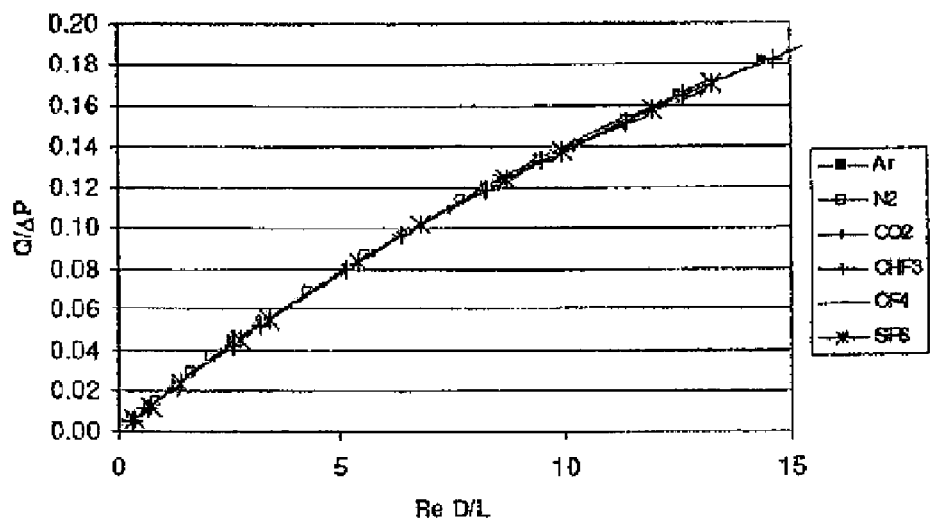
FIG. 6 is a graph showing a characteristic function of a flow sensor or flow controller in accordance with one or more aspects of the invention.

For example, the data from the same device from FIG. 5 can be modified in terms of the relationship including dimensionless parameters presented in equation (8). The characteristic information for each of the fluids at each of the flow rates are presented in FIG. 6. As shown in FIG. 6, the characteristic relationship can be expressed as a characteristic function for a plurality of fluids according to the relationship of equation (8).

The unique characteristic curve in FIG. 6 essentially provides the pertinent information for calibrating the device for use with any process gas based on the physical properties of the gas including its density, $\rho$, viscosity, $\mu$, and the overall pressure drop, $\Delta$P.

The functional relationship can be established by first calibrating the multi-gas sensor or flow control device with a single calibration gas. The calibration information can then be represented as a characteristic function defined by the dimensionless quantities, Q/$\Delta$P and Re(D/L). The calibration curve for a process gas may then be generated by extracting the characteristic information using only the physical properties of the process gas. The techniques of the present invention can therefore simplify calibration of multi-gas flow control devices by avoiding a priori characterization with multiple gases.

Figure 7:
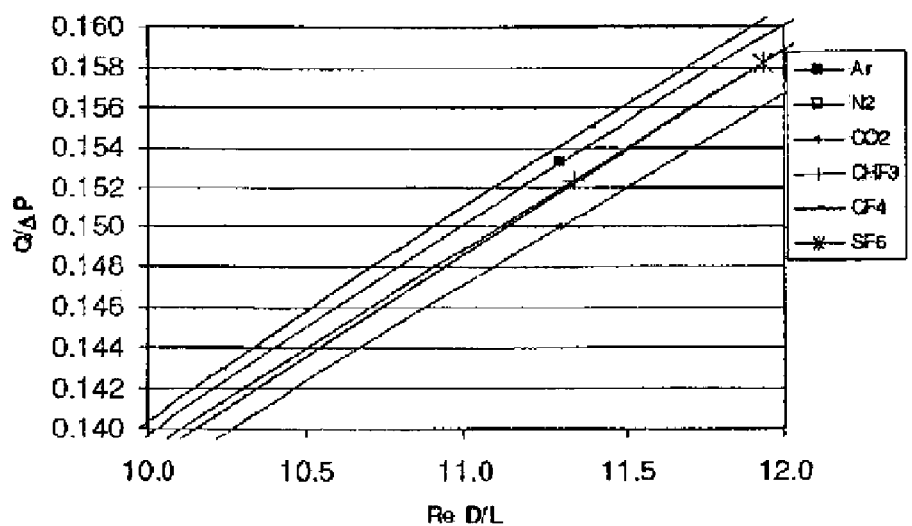
FIG. 7 is a graph showing a portion of the characteristic function presented in FIG. 6.

Other aspects of the invention provide compensated correlative information. As shown in FIG. 7, which is an enlarged portion of the characteristic function presented in FIG. 6, a residual error can exist for different fluids. For example, an offset of about 2% to about 3% can be observed between the characteristic curve based on nitrogen and the characteristic curve based on argon. Further, an offset of about 1 to about 2% can be noted between the characteristic curves based on $SF_6$ and other gases, such as argon.

Figure 8:
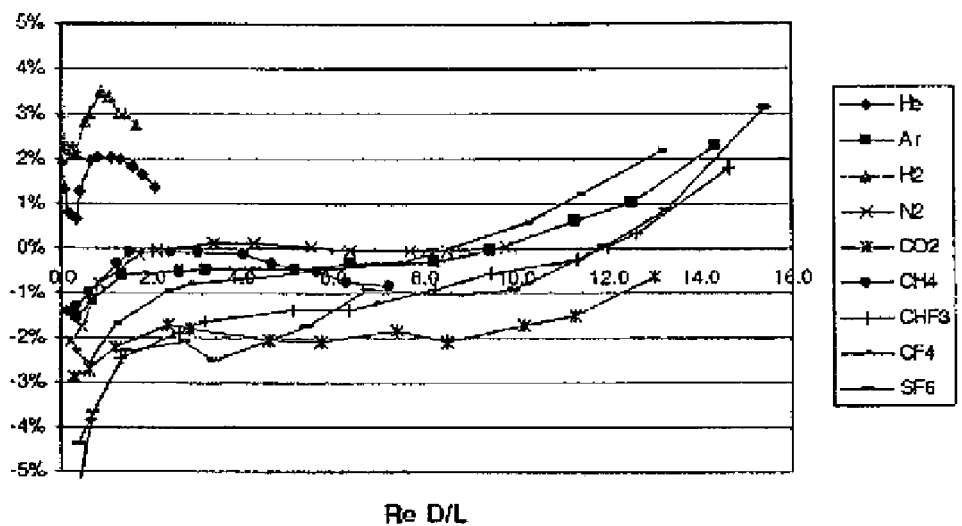
FIG. 8 is a graph showing residual errors for some relationships of various fluids.

Quantitative examples for the residual error associated with the uncompensated model for various fluids are as shown in FIG. 8.

The gas-dependent residual error discussed can be compensated in accordance with some aspects of the invention to provide calibration accuracy to within a few percent. Thus, in some aspects of the invention, compensation can be effected by a gas specific bypass bias function, $F_B$.

The bypass bias function $F_B$ can be defined, in some embodiments of the invention, to be the ratio of Q/$\Delta$P of a process gas to that of the calibration gas, exemplarily chosen to be nitrogen (N2), as expressed by a function of the dimensionless variable, X=ReD/L, as, for example:

$$F_B(X) = \frac{\left(\frac{Q}{\Delta P}\right)_{pg}}{\left(\frac{Q}{\Delta P}\right)_{N2}}. \quad (9)$$

The bypass bias function may be represented by any closed-form expression, such as a simple polynomial. It may also be represented by a spline interpolation function, or simply as a look-up table. For illustrative purposes, the bypass bias function is represented as a cubic polynomial of X:

$$F_B(X) = \frac{\left(\frac{Q}{\Delta P}\right)_{pg}}{\left(\frac{Q}{\Delta P}\right)_{N2}} = \{a_0 + a_1 X + a_2 X^2 + a_3 X^3 + \ldots\} \quad (10)$$

The value of the coefficients, $a_0$, $a_1$, $a_2$, and $a_3$, in the bypass bias function can be determined by comparing the uncompensated model against the actual process gas test data, when the data for the process gas exist. If the test data does not exist, however, the values, $a_0=1$ and $a_1$, $a_2$, and $a_3=0$, may be selected.

For the specific flow control device that was used to generate the data in FIGS. 6 and 7, the bypass bias functions for all the gases investigated had $a_0$ values close to 1.0. As shown in Table 1, the coefficient $a_0$ is typically close to 1.0, and the coefficients $a_1$, $a_2$, and $a_3$ are typically zero. This suggests that for any gas without available test data, the coefficients $a_0=1$, and $a_1$, $a_2$, and $a_3=0$ can provide a characteristic information for calibration to within less than 5%.

TABLE 1

Bypass Bias Function Coefficients for Various Fluids.

| Gas | $a_0$ | $a_1$ | $a_2$ | $a_3$ |
|---|---|---|---|---|
| He | 1.00986 | −0.00589 | 0.01656 | −0.00643 |
| Ar | 0.98982 | 0.00308 | −0.00055 | 0.00004 |
| $H_2$ | 1.03104 | −0.03856 | 0.06015 | −0.02383 |
| $N_2$ | 0.97000 | 0.02057 | −0.00386 | 0.00021 |
| $CO_2$ | 0.96019 | 0.01039 | −0.00173 | 0.00009 |
| $CH_4$ | 0.98084 | 0.01200 | −0.00273 | 0.00018 |
| $CHF_3$ | 0.95796 | 0.01222 | −0.00164 | 0.00008 |
| $CF_4$ | 0.97218 | 0.01109 | −0.00170 | 0.00009 |
| $SF_6$ | 0.96854 | 0.00483 | −0.00071 | 0.00005 |

This further advantageous feature of the invention provides a model for any process gas with quantifiable or measurable physical properties, such as viscosity and molecular weight.

With the bypass bias function, the calibration curve for the process gas may be determined according to a compensated model:

$$\left(\frac{Q}{\Delta P}\right)_{pg} = \left(\frac{Q}{\Delta P}\right)_{N2} * F_B \quad (11)$$

where $F_B$ is the bypass bias function defined in equations (9) and (10) above.

Figure 9:
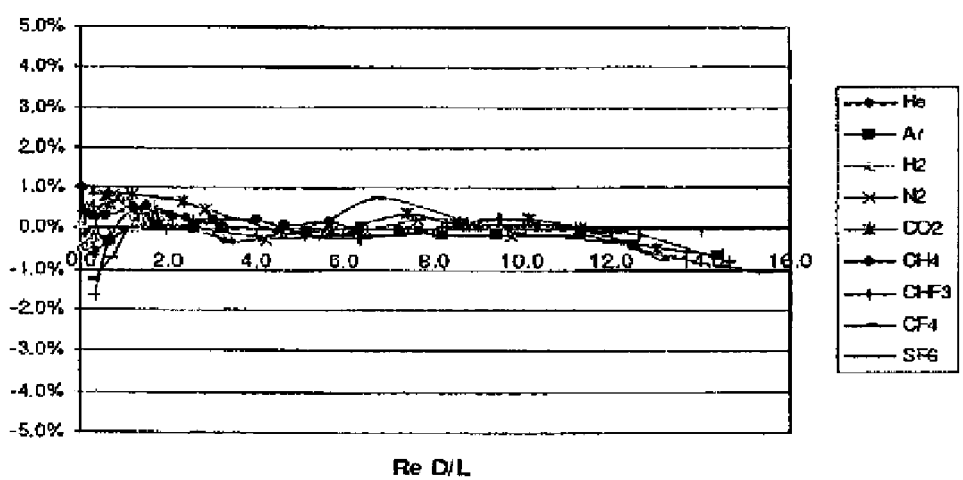
FIG. 9 is a graph showing residual errors after applying a compensation function in accordance with one or more embodiments of the invention.

FIG. 9 is a graph of the residual error, plotted as the ordinate, relative to the dimensionless parameter, Nf=ReD/L, of the calibration curve generated according to the compensated model for the same flow control device used to generate the uncompensated residual error presented in FIG. 8. The data shows that the compensation model of the invention can reduce the unacceptable error significantly.

An alternative approach for the bypass bias function involves the ratio:

$$\frac{\left(\frac{Q}{\Delta P}\right)_{pg}}{F_B}. \quad (12)$$

Based on equations (10) and (11), the ratio above can be expressed approximately as:

$$\frac{\left(\frac{Q}{\Delta P}\right)_{pg}}{F_B} \cong \left(\frac{Q}{\Delta P}\right)_{N2}. \quad (13)$$

Figure 10:
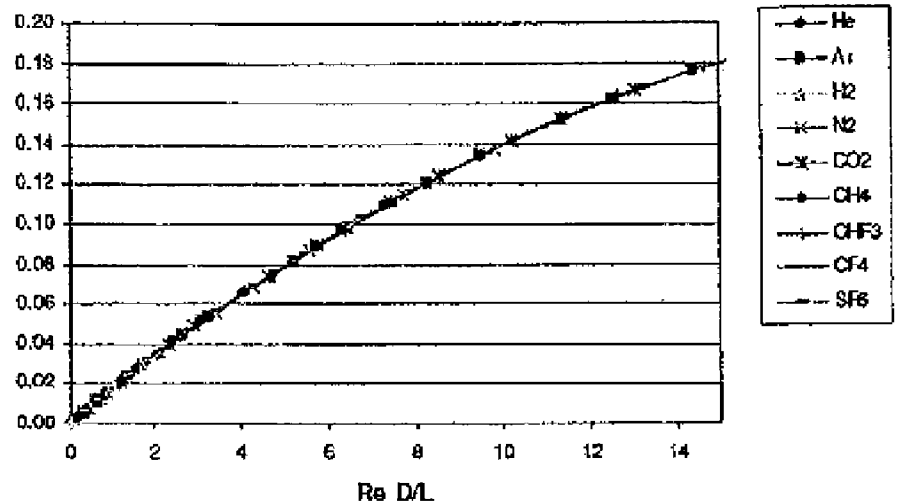
FIG. 10 is a graph showing a compensated characteristic function or relationship for a flow sensor or flow controller in accordance with one or more aspects of the invention.
Figure 11:
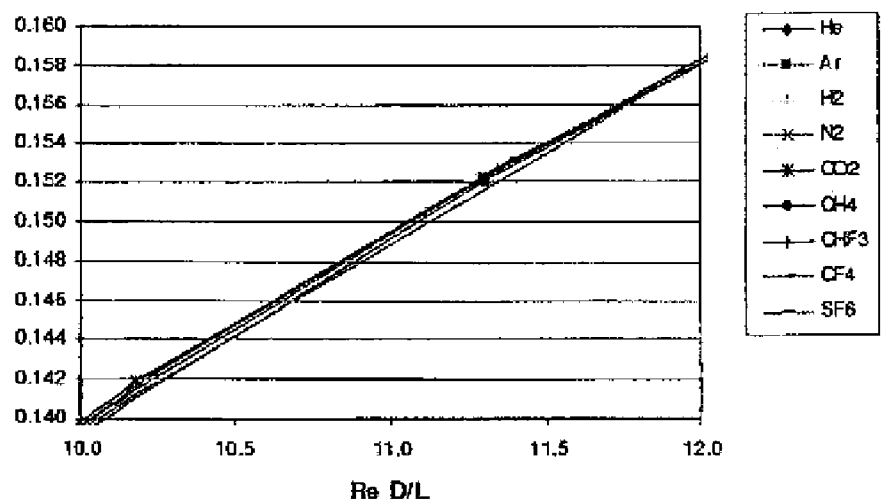
FIG. 11 is a graph showing a portion of the characteristic function or relationship presented in FIG. 10.

Equation (13) can be used to provide an accurate, single universal curve by dividing the process gas data by the gas specific bypass bias function. FIG. 10 graphically illustrates the results according to equation (13) by dividing the parameter Np (from FIG. 6) by $F_B$. An enlarged view of a portion of FIG. 10 is shown in FIG. 11. FIG. 11 shows that the correlation between different gases in the compensated model is greatly improved.

In the present invention, the characteristic curve represented by equation (8), can be established by using nitrogen as the calibration gas. However, any gas may be utilized as the calibration gas, provided that the same gas is used as the reference gas in equation (9) for the bypass bias function.

Further aspects of the invention can also involve computer readable media that includes instructions executable on one or more computer systems that perform any of the above advantageous aspects. For example, one or more aspects of the invention may pertain to computer readable media that includes instructions that generate a characteristic function of a sensor or a flow control device based on calibration information involving a plurality of flow rates for at least one calibration gas.

The one or more processors may be implemented using one or more computer systems which may be, for example, a digital signal processor or a general-purpose computer such as those based on an Intel PENTIUM®-type processor, a Motorola PowerPC® processor, a Hewlett-Packard PA-RISC® processor, a Sun UltraSPARC® processor, or any other type of processor or combination thereof. Alternatively or in addition, the computer system may include specially-programmed, special-purpose hardware, for example, an application-specific integrated circuit (ASIC) tailored to the functionality of flow control device.

The one or more processors 150 are typically connected to one or more memory devices 180, which can comprise, for example, any one or more of a disk drive memory, a flash memory device, a RAM memory device, or other device for storing data, or combinations thereof. The memory is typically used for storing programs and data during operation of the flow control device. For example, the memory may be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code may be written in any of a plurality of programming languages.

Components of the computer system may be coupled by one or more interconnection mechanisms, which may include one or more busses, e.g., between components that are integrated within a same device, and/or a network, e.g., between components that reside on separate discrete devices. The interconnection mechanism typically enables communications, e.g., data and/or instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include sensors for measuring any one or more parameters of system and/or components thereof. Alternatively, the components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem, while still providing data therebetween. Such communication mechanisms may be effected by utilizing any suitable technique including but not limited to those utilizing wireless protocols.

The control system can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does the storage medium.

Although the computer system is described by way of example as one type of computer system upon which various aspects of the invention may be practiced, it should be appreciated that the invention is not limited to being implemented in software, or on the computer system as exemplarily shown.

The embodiments presented herein may be implemented as software used in a microprocessor or computer. Further, it should be appreciated that one or more features or aspects of the invention may be implemented in software, hardware or firmware, or any combination thereof. For example, one or more segments of any algorithm of the invention can be performed in or integrated with a mass flow sensor rather than implemented or executed by the processor.

The following examples illustrate certain aspects and features of the invention but do not represent the full scope thereof.

Example 1

Multi-Gas Device Calibration Process

Figure 12:
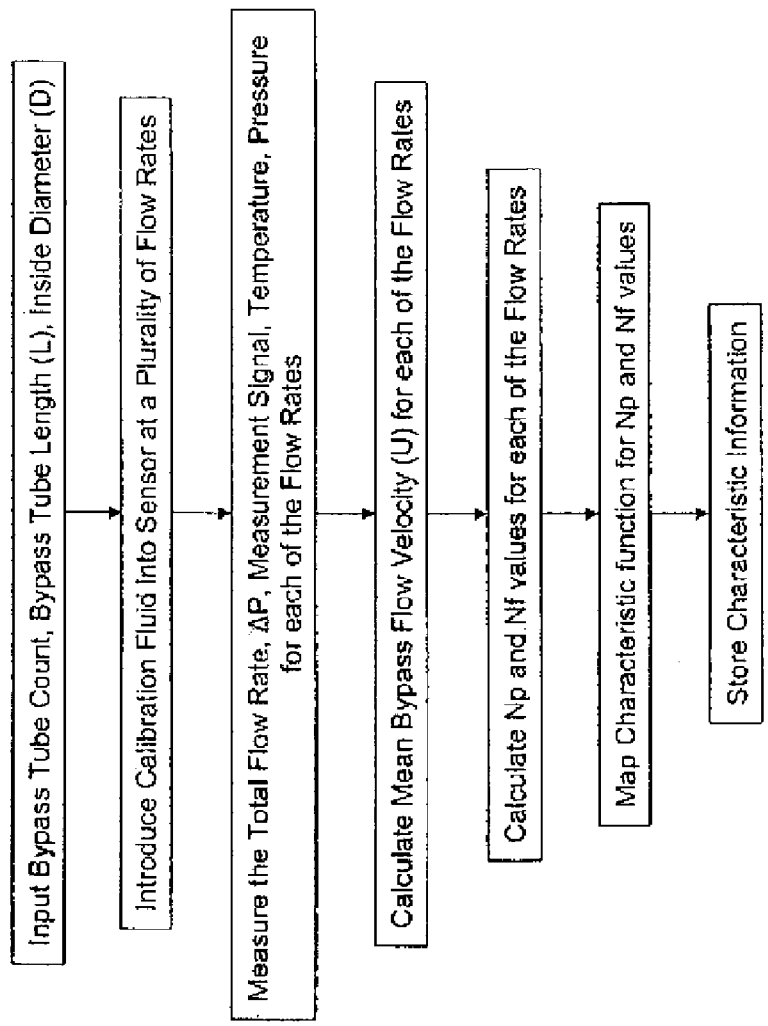
FIG. 12 is a flow diagram illustrating a technique for obtaining characteristic information of a flow sensor or flow controller in accordance with one or more aspects of the invention.
Figure 13:
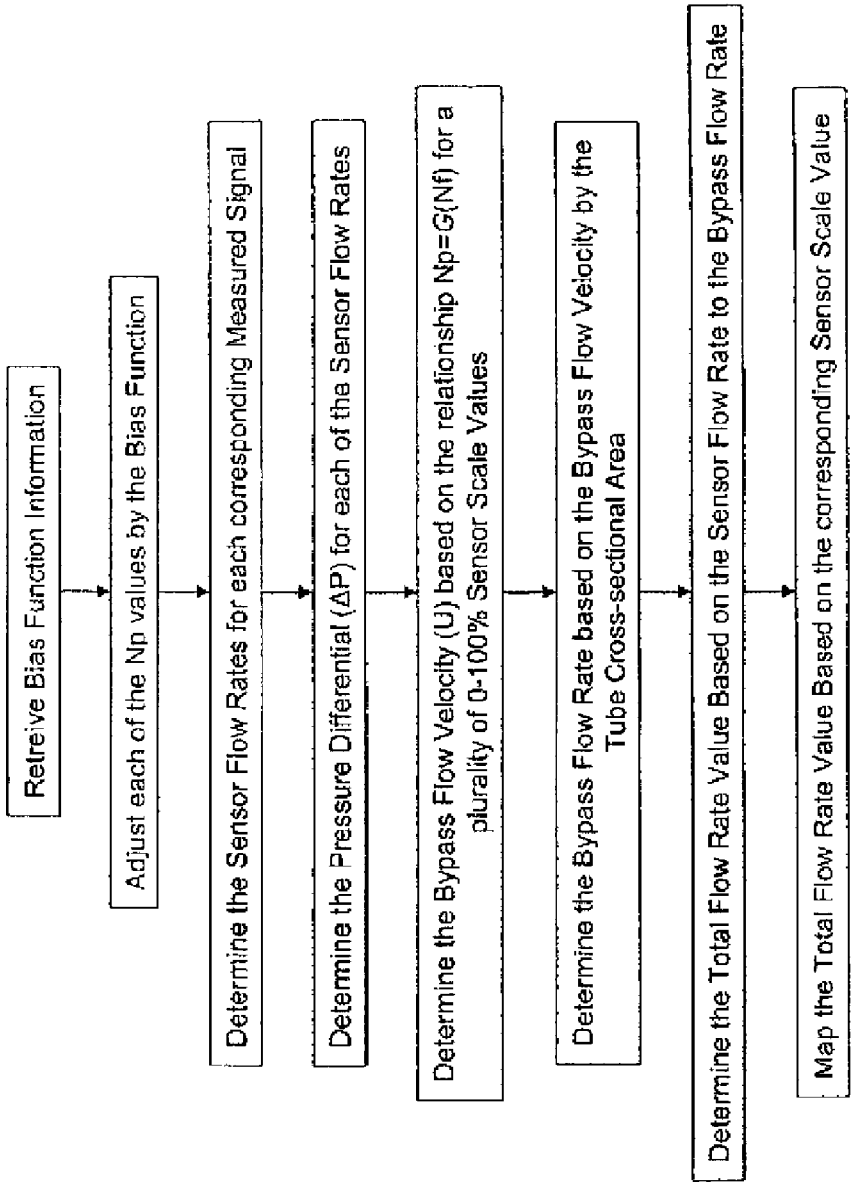
FIG. 13 is a flow diagram illustrating a technique for obtaining calibration information of a flow sensor or flow controller in accordance with one or more aspects of the invention.

The following procedure is illustrated with reference to FIGS. 12 and 13.

A. Calibration to Establish the Uncompensated (Np, Nf) Curve.

A.1. Calibrate the flow control device by using a preferably inert gas, such as nitrogen, as the calibration gas. Pluralities of flow rates or set points are run. For each, measure the total flow rate and the overall sensor pressure drop, $(\Delta P)N_2$. Record along with the corresponding sensor output signal, the gas temperature, the gas pressure, the bypass tube count, the bypass tube length, L, and the inside diameter, D.

A.2. From the measurement in A.1 above, using the recorded bypass tube count and tube length, L, and diameter, D, calculate the mean bypass flow velocity, U, at each of the set points tested.

A.3. At each of the set-points, from the recorded $(\Delta P)N_2$ and the bypass flow velocity U determined in A.2 above, calculate the corresponding pair of dimensionless quantities $Q/(\Delta P)N_2$ and $(ReD/L)_{N2}$, according to:

$$Q = 0.5(\rho U^2)$$

$$Re = \frac{\rho U D}{\mu}$$

where $\rho$ and $\mu$ are the density and viscosity of the calibration gas, $N_2$, respectively. Determine the characteristic correlation curve for the flow control device by tabulating the dimensionless quantity pairs collected above. The characteristic correlation curve for the flow control device will be used as the uncompensated universal model or representation for generating the calibration curve for any other process gas for the flow control device.

B. Generate the Uncompensated Process Gas $Q/\Delta P$~ReD/L Curve.

B.1 To establish the calibration curve for a certain process gas, determine the process gas sensor flow, $V_s$, at full-scale sensor output through, for example, a sensor model. An example of a sensor model that may be utilized is described by Wang et al. in U.S. Pat. No. 7,043,374. Determine the corresponding process gas flow pressure drop, $(\Delta P)_{pg}$, across the sensor. The pressure drop in the flow sensor when flowing the process gas, $(\Delta P)_{pg}$, may be determined by multiplying the nitrogen pressure drop, $(\Delta P)_{N2}$, recorded above, by the theoretical pressure drop ratio, $(\Delta P)_{pg}/(\Delta P)_{N2}$, based on established theories. In the case of fully-developed laminar flow, for example, the pressure drop may be calculated from the relationship:

$$\Delta P = \frac{128 \, \mu V_s L}{\pi D^4},$$

where the volumetric flow rate, $V_S$, may be determined from the relationship:

$$V_s = U_s \left(\frac{1}{4}\pi D^2\right),$$

and $U_s$ is the mean flow velocity through the sensor.

B.2 Determine the characteristic correlation curve obtained in A.3 above. Use the relevant process gas properties and the full-scale pressure drop, $(\Delta P)_{pg}$, obtained in B.1 above to calculate the full-scale process gas bypass flow velocity, U, by using the information imbedded in the process gas specific Q/ΔP~ReD/L characteristic curve. The calculations involved in solving the implicit equation Q/ΔP~ReD/L will be described below. This determines the process-gas bypass flow at full-scale.

B.3 Continue to generate Q/ΔP and ReD/L data pairs at a plurality of process gas sensor flow rates from zero to 100% (full-scale) using the same step in B.2 above. This generates the tabulated, uncompensated Q/ΔP vs. ReD/L function for the process gas. Note that the calculation only involves the uncompensated universal bypass characteristic curve.

C. Generate the Compensated Process Gas Q/ΔP~ReD/L Curve.

C.1 At the respective ReD/L, multiply the uncompensated process gas Q/ΔP value obtained in B.3 above by the gas-specific bypass bias function, $F_B$, to give the compensated Q/ΔP vs. ReD/L array for the process gas. The bypass bias function, $F_B$, may be represented as polynomials, with the polynomial coefficients for different process gases stored in a database or look-up table. Representative $F_B$ polynomial coefficients for several gases are shown in Table 1 above. These coefficients are typically determined from the mean bypass characteristic curves of several representative high-flow devices of a particular design.

D. Construct the Process-Gas Calibration Curve.

D.1 After generating the compensated Q/ΔP vs. ReD/L curve or table, the process gas calibration curve can be constructed as follows. The process gas sensor flow at each of a plurality of set points (with corresponding sensor output values) is calculated by, for example, using a sensor model or the sensor calibration curve. Second, at each of these process gas sensor flows, calculate the sensor pressure drop, $(\Delta P)_{pg}$, by, for example, using the same theoretical formula described in B.1 above. From the pressure drop, $(\Delta P)_{pg}$, calculate the bypass flow velocity, U, based on the compensated characteristic function, Q/ΔP vs. ReD/L, obtained from C.3 above. The details of this specific calculation are described in below.

D.2 To map the process gas calibration curve, the calculations in D.1 above are repeated until a satisfactory list of bypass velocities at various set points is generated, typically ranging from 0 to 100% of specified device flow capacity. Multiplying each of the bypass flow velocities by the tube cross-sectional area gives the bypass flow per tube, and multiplying the bypass flow per tube by the bypass tube count gives the total process gas flow at the corresponding device set points. Adding the sensor flow to the bypass flow gives the total flow rate at the respective set points.

Example 2

Solving the Implicit Equation Q/ΔP~ReD/L

This example describes the details of the calculation involved in determining U from the Q/ΔP vs. ReD/L relationship.

For a given gas with fixed properties, such as viscosity and molecular weight, the dimensionless quantity, Q/ΔP, is proportional to $U^2/\Delta P$ and the dimensionless quantity, ReD/L, is proportional to U. The Q/ΔP~ReD/L curve can thus be an implicit function between $U^2/\Delta P$ and U.

Determining U for a given ΔP can involve solving this implicit equation, for which various techniques exist. For example, the implicit equation may be solved iteratively as follows to determine the value of ReD/L for a given pressure drop ΔP. As a first approximation, the iteration may start by taking ReD/L to be the maximum ReD/L in the tabulated Q/ΔP~ReD/L function. Using the given gas density, the gas viscosity, and the starting value of ReD/L, calculate the flow speed, $U_1$, from which $Q_1(=\frac{1}{2}\rho U_1^2)$ may be calculated. With the given ΔP, this gives the first estimate, $(Q/\Delta P)_i$, corresponding to the starting value of ReD/L. Typically the calculated $(Q/\Delta P)_i$ from the first approximation will typically not correlate with the Q/ΔP value corresponding to the starting ReD/L value. Following iterations may therefore be needed for the solution.

The iteration can proceed as follows.

(1) if the calculated (Q/ΔP), overshoots the tabulated Q/ΔP, slightly decrease the current value of ReD/L; or, (2) if the calculated (Q/ΔP), undershoots the tabulated Q/ΔP, slightly increase the current value of ReD/L.

Repeat the U, Q, and $(Q/\Delta P)_2$ calculations described above by using the revised ReD/L.

Check the revised value of (Q/ΔP), against the value according to the tabulated compensated Q/ΔP~ReD/L function.

Continue the iterative process until the calculated (Q/ΔP) and the tabulated (Q/ΔP) match to within a desired tolerance, e.g., to within less than 0.01% or even to within 0.0001%.

The final (ReD/L) value corresponding to the (Q/ΔP) is the solution to the implicit Q/ΔP~ReD/L equation.

The method above is included here as an example only. Various other methods for solving this equation are equally applicable.

Example 3

Multi-Gas Device Process Control

Figure 14:
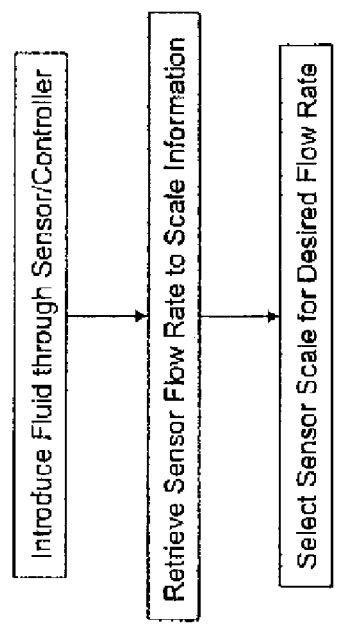
FIG. 14 is a flow diagram illustrating a technique for controlling a flow rate of a fluid in accordance with one or more aspects of the invention.

The following procedure is illustrated with reference to FIG. 14.

Flow control to a desired set point may be performed by providing a predetermined set point flow rate. The process gas can then be introduced into the flow control device. Retrieve the sensor operating information including, for example, the measured sensor flow rate and the pressure differential. Select the sensor scale value corresponding to the desired flow rate based on the compensated or uncompensated characteristic function.

The physical and measured attributes of the sensor conduit with a mass flow meter of the sensor assembly utilized herein are listed in Table 2. The physical and measured attributes of the bypass of the sensor assembly utilized herein are listed in Table 3. The density of each of the gases flowing through the sensor conduit and the bypass is listed in Table 4 at a pressure of 1 atm and at the corresponding measured temperatures listed in Tables 2 and 3.

TABLE 2

Sensor Conduit Attributes.

| | |
|---|---|
| Length | 3.81 cm (1.5 inch) |
| Diameter | 0.0356 cm (0.014 inch) |
| Temperature | 325.15 K |
| Pressure | 760 torr |

TABLE 3

Bypass Attributes.

| | |
|---|---|
| Length | 3.81 cm (1.5 inch) |
| Tube Diameter | 0.0775 cm (0.0305 inch) |
| Temperature | 298.15 K |
| Pressure | 760 torr |
| Number of Tubes | 138 |

TABLE 4

Sensor Conduit and Bypass Gas Densities.

| Gas | Density of Gas in Sensor Conduit (lb/ft$^3$) | Density of Gas in Bypass (lb/ft$^3$) |
|---|---|---|
| He | 0.0094 | 0.0102 |
| Ar | 0.0935 | 0.1019 |
| $H_2$ | 0.0047 | 0.0051 |
| $N_2$ | 0.0655 | 0.0715 |
| $CO_2$ | 0.1032 | 0.1125 |
| $CH_4$ | 0.0375 | 0.0409 |
| $CHF_3$ | 0.1638 | 0.1786 |
| $CF_4$ | 0.2059 | 0.2246 |
| $SF_6$ | 0.3417 | 0.1809 |

Tables 5, 6, and 7 list the measured actual flow rates, the sensor conduit flow, and the flow in bypass tube, respectively, for each of the various gases at various flow controller set points.

TABLE 5

Actual Gas Flow (sccm).

| Set Point % | $N_2$ | $H_2$ | He | $CH_4$ | $CF_4$ |
|---|---|---|---|---|---|
| 2.5 | 753.5 | 772.4 | 1083.9 | 586.3 | 325.9 |
| 5 | 1512.3 | 1540.7 | 2164.1 | 1176.1 | 648.9 |
| 10 | 3015.2 | 3063.2 | 4282.6 | 2335.9 | 1287.9 |
| 20 | 5997.1 | 6152.6 | 8585.6 | 4671.1 | 2545.3 |
| 25 | 7489.3 | 7735.2 | 10862.3 | 5857.9 | 3169.7 |
| 40 | 11998.1 | 12772.3 | 17919.5 | 9448.3 | 5032.2 |
| 50 | 15026.0 | 16283.6 | 22807.5 | 11888.1 | 6271.0 |
| 65 | 19557.8 | 21850.2 | 30411.2 | 15594.7 | 8105.8 |
| 75 | 22565.7 | 25614.6 | 35645.7 | 18062.5 | 9340.2 |
| 90 | 27084.2 | 31361.2 | 43689.2 | 21799.2 | 11192.4 |
| 100 | 30058.7 | 35345.5 | 49120.4 | 24237.0 | 12447.8 |
| 115 | 34507.1 | 41335.2 | 57363.7 | 27930.3 | 14347.7 |

| Set Point % | $CO_2$ | $CHF_3$ | Ar | $SF_6$ |
|---|---|---|---|---|
| 2.5 | 568.0 | 384.0 | 1071.3 | 203.5 |
| 5 | 1136.2 | 779.8 | 2145.6 | 408.6 |
| 10 | 2246.8 | 1552.3 | 4237.9 | 812.7 |
| 20 | 4426.9 | 3053.1 | 8294.3 | 1589.1 |
| 25 | 5501.4 | 3799.7 | 10299.5 | 1965.1 |
| 40 | 8699.3 | 6013.5 | 16249.7 | 3115.2 |
| 50 | 10822.1 | 7465.3 | 20172.1 | 3886.6 |
| 65 | 14003.7 | 9646.2 | 25932.2 | 4986.2 |
| 75 | 16054.7 | 11104.4 | 29767.9 | 5717.2 |
| 90 | 19212.9 | 13271.5 | 35521.3 | 6849.1 |
| 100 | 21304.0 | 14773.4 | 39326.9 | 7618.5 |
| 115 | 24548.9 | 17132.0 | 45210.5 | 8853.9 |

TABLE 6

Sensor Conduit Flow (sccm) for the Various Gases.

| | % of Set Output | | | | | |
|---|---|---|---|---|---|---|
| | 2.5% | 5% | 10% | 20% | 25% | 40% |
| He | 0.26016 | 0.52300 | 1.04275 | 2.09976 | 2.64552 | 4.35903 |
| Ar | 0.26468 | 0.53210 | 1.06090 | 2.13601 | 2.69111 | 4.44075 |
| $H_2$ | 0.18313 | 0.36816 | 0.73403 | 1.47810 | 1.86228 | 3.06848 |
| $N_2$ | 0.18749 | 0.37691 | 0.75149 | 1.51326 | 1.90647 | 3.14175 |
| $CO_2$ | 0.14004 | 0.28152 | 0.56129 | 1.13009 | 1.42381 | 2.34956 |
| $CH_4$ | 0.14379 | 0.28907 | 0.57635 | 1.16058 | 1.46223 | 2.40896 |
| $CHF_3$ | 0.09686 | 0.19472 | 0.38824 | 0.78162 | 0.98508 | 1.62666 |
| $CF_4$ | 0.08098 | 0.16280 | 0.32459 | 0.65352 | 0.82336 | 1.35867 |
| $SF_6$ | 0.05152 | 0.10356 | 0.20648 | 0.41570 | 0.52390 | 0.86505 |

| | % of Set Output | | | | | |
|---|---|---|---|---|---|---|
| | 50% | 65% | 75% | 90% | 100% | 115% |
| He | 5.56499 | 7.46696 | 8.79458 | 10.8689 | 12.2967 | 14.4967 |
| Ar | 5.67783 | 7.64311 | 9.03296 | 11.2533 | 12.8333 | 15.3777 |
| $H_2$ | 3.91741 | 5.25627 | 6.19083 | 7.65105 | 8.65609 | 10.2051 |
| $N_2$ | 4.01424 | 5.39493 | 6.36279 | 7.88629 | 8.94586 | 10.6079 |
| $CO_2$ | 3.00418 | 4.04435 | 4.78010 | 5.95685 | 6.79361 | 8.14556 |
| $CH_4$ | 3.07550 | 4.12956 | 4.86719 | 6.02269 | 6.82037 | 8.05589 |
| $CHF_3$ | 2.08107 | 2.80704 | 3.32550 | 4.16649 | 4.77855 | 5.79243 |
| $CF_4$ | 1.73719 | 2.33855 | 2.76381 | 3.44368 | 3.92681 | 4.70673 |
| $SF_6$ | 1.10663 | 1.49234 | 1.76745 | 2.21325 | 2.53645 | 3.07107 |

TABLE 7

Flow in Bypass Tube (sscm).

| | Set Point % | | | | | |
|---|---|---|---|---|---|---|
| | 2.5% | 5% | 10% | 20% | 25% | 40% |
| He | 7.852 | 15.678 | 31.026 | 62.199 | 78.693 | 129.820 |
| Ar | 7.761 | 15.544 | 30.702 | 60.088 | 74.615 | 117.720 |
| $H_2$ | 5.596 | 11.162 | 22.192 | 44.574 | 56.040 | 92.531 |
| $N_2$ | 5.459 | 10.956 | 21.844 | 43.446 | 54.257 | 86.920 |
| $CO_2$ | 4.115 | 8.232 | 16.277 | 32.071 | 39.855 | 63.022 |
| $CH_4$ | 4.248 | 8.520 | 16.922 | 33.840 | 42.438 | 68.449 |
| $CHF_3$ | 2.782 | 5.650 | 11.245 | 22.118 | 27.527 | 43.564 |
| $CF_4$ | 2.361 | 4.701 | 9.330 | 18.440 | 22.963 | 36.456 |
| $SF_6$ | 1.474 | 2.960 | 5.888 | 11.512 | 14.236 | 22.567 |

| | Set Point % | | | | | |
|---|---|---|---|---|---|---|
| | 50% | 65% | 75% | 90% | 100% | 115% |
| He | 165.232 | 220.317 | 258.239 | 316.510 | 355.855 | 415.574 |
| Ar | 146.134 | 187.859 | 215.644 | 257.319 | 284.885 | 327.501 |
| $H_2$ | 117.968 | 158.297 | 185.568 | 227.200 | 256.064 | 299.456 |
| $N_2$ | 108.855 | 141.684 | 163.473 | 196.205 | 217.752 | 249.975 |
| $CO_2$ | 78.399 | 101.447 | 116.304 | 139.181 | 154.327 | 177.832 |
| $CH_4$ | 86.123 | 112.975 | 130.853 | 157.922 | 175.581 | 202.335 |
| $CHF_3$ | 54.043 | 69.880 | 80.443 | 96.140 | 107.019 | 124.103 |
| $CF_4$ | 45.429 | 58.721 | 67.663 | 81.079 | 90.173 | 103.935 |
| $SF_6$ | 28.156 | 36.121 | 41.416 | 49.615 | 55.188 | 64.137 |

Table 8 lists the pressure differential at various set points for the various gases. Table 9 lists the data for the uncompensated model presented in FIGS. 6 and 7. Table 10 lists the data for the compensated model presented in FIGS. 10 and 11.

TABLE 8

Pressure Differential at Various Set Points.

| | Set Point % | | | | | |
|---|---|---|---|---|---|---|
| | 2.5% | 5% | 10% | 20% | 25% | 40% |
| He | 0.07860 | 0.15801 | 0.31503 | 0.63438 | 0.79926 | 1.31694 |
| Ar | 0.09268 | 0.18632 | 0.37149 | 0.74795 | 0.94233 | 1.55499 |
| $H_2$ | 0.02484 | 0.04993 | 0.09956 | 0.20048 | 0.25258 | 0.41618 |
| $N_2$ | 0.05129 | 0.10310 | 0.20557 | 0.41395 | 0.52151 | 0.85942 |
| $CO_2$ | 0.03294 | 0.06623 | 0.13204 | 0.26585 | 0.33494 | 0.55272 |
| $CH_4$ | 0.02475 | 0.04975 | 0.09919 | 0.19974 | 0.25165 | 0.41458 |

TABLE 8-continued

Pressure Differential at Various Set Points.

| | | | | | | |
|---|---|---|---|---|---|---|
| $CHF_3$ | 0.02256 | 0.04534 | 0.09041 | 0.18201 | 0.22939 | 0.37879 |
| $CF_4$ | 0.02174 | 0.04370 | 0.08713 | 0.17544 | 0.22103 | 0.36474 |
| $SF_6$ | 0.01208 | 0.02429 | 0.04842 | 0.09748 | 0.12286 | 0.20286 |

| | Set Point % | | | | | |
|---|---|---|---|---|---|---|
| | 50% | 65% | 75% | 90% | 100% | 115% |
| He | 1.68128 | 2.25590 | 2.6570 | 3.2837 | 3.71505 | 4.3797 |
| Ar | 1.98817 | 2.67634 | 3.1630 | 3.9404 | 4.49374 | 5.3847 |
| $H_2$ | 0.53132 | 0.71291 | 0.8397 | 1.0377 | 1.17404 | 1.3841 |
| $N_2$ | 1.09809 | 1.47577 | 1.7405 | 2.1573 | 2.44712 | 2.9018 |
| $CO_2$ | 0.70672 | 0.95141 | 1.1245 | 1.4013 | 1.59816 | 1.9162 |
| $CH_4$ | 0.52929 | 0.71070 | 0.8376 | 1.0365 | 1.17379 | 1.3864 |
| $CHF_3$ | 0.48460 | 0.65366 | 0.7744 | 0.9702 | 1.11275 | 1.3488 |
| $CF_4$ | 0.46635 | 0.62778 | 0.7419 | 0.9244 | 1.05415 | 1.2635 |
| $SF_6$ | 0.25951 | 0.34996 | 0.4145 | 0.5190 | 0.59481 | 0.7202 |

TABLE 9

Data for the Q/ΔP vs. ReD/I, Model in FIGS. 6 and 7.

| | Set Point % | | | | | |
|---|---|---|---|---|---|---|
| | 2.5% | 5% | 10% | 20% | 25% | 40% |
| ReD/L | 0.03956 | 0.07898 | 0.15630 | 0.31333 | 0.39643 | 0.65398 |
| He | 0.00072 | 0.00142 | 0.00279 | 0.00557 | 0.00708 | 0.01170 |
| ReD/L | 0.34093 | 0.68281 | 1.34863 | 2.63950 | 3.27760 | 5.17107 |
| Ar | 0.00593 | 0.01183 | 0.02314 | 0.04403 | 0.05389 | 0.08129 |
| ReD/L | 0.03164 | 0.06312 | 0.12549 | 0.25206 | 0.31690 | 0.52325 |
| $H_2$ | 0.00058 | 0.00115 | 0.00228 | 0.00456 | 0.00572 | 0.00947 |
| ReD/L | 0.21424 | 0.42997 | 0.85729 | 1.70509 | 2.12936 | 3.41128 |

TABLE 9-continued

Data for the Q/ΔP vs. ReD/I, Model in FIGS. 6 and 7.

| | | | | | | |
|---|---|---|---|---|---|---|
| $N_2$ | 0.00372 | 0.00745 | 0.01485 | 0.02917 | 0.03611 | 0.05623 |
| ReD/L | 0.30130 | 0.60273 | 1.19184 | 2.34828 | 2.91827 | 4.61459 |
| $CO_2$ | 0.00518 | 0.01030 | 0.02020 | 0.03896 | 0.04775 | 0.07236 |
| ReD/L | 0.15276 | 0.30643 | 0.60859 | 1.21701 | 1.52622 | 2.46168 |
| $CH_4$ | 0.00267 | 0.00535 | 0.01058 | 0.02100 | 0.02622 | 0.04140 |
| ReD/L | 0.32813 | 0.66642 | 1.32652 | 2.60910 | 3.24708 | 5.13888 |
| $CHF_3$ | 0.00548 | 0.01125 | 0.02236 | 0.04297 | 0.05280 | 0.08009 |
| ReD/L | 0.29812 | 0.59363 | 1.17822 | 2.32864 | 2.89987 | 4.60376 |
| $CF_4$ | 0.00515 | 0.01016 | 0.02008 | 0.03895 | 0.04794 | 0.07322 |
| ReD/L | 0.35468 | 0.71213 | 1.41656 | 2.76986 | 3.42514 | 5.42974 |
| $SF_6$ | 0.00600 | 0.01203 | 0.02387 | 0.04534 | 0.05501 | 0.08372 |

| | Set Point % | | | | | |
|---|---|---|---|---|---|---|
| | 50% | 65% | 75% | 90% | 100% | 115% |
| ReD/L | 0.83237 | 1.10987 | 1.30091 | 1.59445 | 1.79266 | 2.09350 |
| He | 0.01484 | 0.01966 | 0.02294 | 0.02788 | 0.03115 | 0.03604 |
| ReD/L | 6.41921 | 8.25210 | 9.47258 | 11.3033 | 12.5141 | 14.3861 |
| Ar | 0.09797 | 0.12028 | 0.13410 | 0.15327 | 0.16474 | 0.18169 |
| ReD/L | 0.66710 | 0.89516 | 1.04937 | 1.28479 | 1.44802 | 1.69340 |
| $H_2$ | 0.01206 | 0.01618 | 0.01888 | 0.02290 | 0.02571 | 0.02982 |
| ReD/L | 4.27213 | 5.56055 | 6.41569 | 7.70027 | 8.54590 | 9.81053 |
| $N_2$ | 0.06902 | 0.08701 | 0.09821 | 0.11414 | 0.12394 | 0.13774 |
| ReD/L | 5.74055 | 7.42813 | 8.51601 | 10.1911 | 11.3002 | 13.0212 |
| $CO_2$ | 0.08758 | 0.10892 | 0.12113 | 0.13920 | 0.15006 | 0.16618 |
| ReD/L | 3.09731 | 4.06302 | 4.70595 | 5.67947 | 6.31455 | 7.27623 |
| $CH_4$ | 0.05133 | 0.06579 | 0.07488 | 0.08814 | 0.09621 | 0.10817 |
| ReD/L | 6.37948 | 8.24306 | 9.48906 | 11.3408 | 12.6240 | 14.6393 |
| $CHF_3$ | 0.09648 | 0.11942 | 0.13358 | 0.15229 | 0.16453 | 0.18253 |
| ReD/L | 5.73702 | 7.41548 | 8.54473 | 10.2390 | 11.3874 | 13.1253 |
| $CF_4$ | 0.08893 | 0.11038 | 0.12400 | 0.14290 | 0.15501 | 0.17181 |
| ReD/L | 6.77434 | 8.69069 | 9.96469 | 11.9374 | 13.2783 | 15.4313 |
| $SF_6$ | 0.10187 | 0.12433 | 0.13801 | 0.15817 | 0.17076 | 0.19048 |

TABLE 10

Data for the Compensated Q/ΔP vs. ReD/L model in FIGS. 10 and 11.

| | Set Point % | | | | | |
|---|---|---|---|---|---|---|
| | 2.5% | 5% | 10% | 20% | 25% | 40% |
| ReD/L | 0.03956 | 0.07898 | 0.15630 | 0.31333 | 0.39643 | 0.65398 |
| He | 0.000710 | 0.001408 | 0.002767 | 0.005521 | 0.007013 | 0.011565 |
| ReD/L | 0.34093 | 0.68281 | 1.34863 | 2.63950 | 3.27760 | 5.17107 |
| Ar | 0.005983 | 0.011928 | 0.023306 | 0.044263 | 0.054145 | 0.081607 |
| ReD/L | 0.03164 | 0.06312 | 0.12549 | 0.25206 | 0.31690 | 0.52325 |
| $H_2$ | 0.000563 | 0.001116 | 0.002217 | 0.004452 | 0.005589 | 0.009249 |
| ReD/L | 0.21424 | 0.42997 | 0.85729 | 1.70509 | 2.12936 | 3.41128 |
| $N_2$ | 0.003815 | 0.007613 | 0.015074 | 0.029315 | 0.036164 | 0.056018 |
| ReD/L | 0.30130 | 0.60273 | 1.19184 | 2.34828 | 2.91827 | 4.61459 |
| $CO_2$ | 0.005373 | 0.010667 | 0.020824 | 0.039907 | 0.048828 | 0.073829 |
| ReD/L | 0.15276 | 0.30643 | 0.60859 | 1.21701 | 1.52622 | 2.46168 |
| $CH_4$ | 0.002718 | 0.005431 | 0.010713 | 0.021177 | 0.026390 | 0.041544 |
| ReD/L | 0.32813 | 0.66642 | 1.32652 | 2.60910 | 3.24708 | 5.13888 |
| $CHF_3$ | 0.005702 | 0.011656 | 0.023018 | 0.043843 | 0.053720 | 0.081081 |
| ReD/L | 0.29812 | 0.59363 | 1.17822 | 2.32864 | 2.89987 | 4.60376 |
| $CF_4$ | 0.005282 | 0.010388 | 0.020422 | 0.039345 | 0.048317 | 0.073518 |
| ReD/L | 0.35468 | 0.71213 | 1.41656 | 2.76986 | 3.42514 | 5.42974 |
| $SF_6$ | 0.006183 | 0.012381 | 0.024508 | 0.046382 | 0.056210 | 0.085319 |

| | Set Point % | | | | | |
|---|---|---|---|---|---|---|
| | 50% | 65% | 75% | 90% | 100% | 115% |
| ReD/L | 0.83237 | 1.10987 | 1.30091 | 1.59445 | 1.79266 | 2.09350 |
| He | 0.014654 | 0.019375 | 0.022576 | 0.027429 | 0.030678 | 0.035641 |
| ReD/L | 6.41921 | 8.25210 | 9.47258 | 11.30327 | 12.51414 | 14.38613 |
| Ar | 0.098304 | 0.120464 | 0.133976 | 0.152117 | 0.162384 | 0.176369 |
| ReD/L | 0.66710 | 0.89516 | 1.04937 | 1.28479 | 1.44802 | 1.69340 |
| $H_2$ | 0.011763 | 0.015745 | 0.018341 | 0.022226 | 0.024985 | 0.029167 |
| ReD/L | 4.27213 | 5.56055 | 6.41569 | 7.70027 | 8.54590 | 9.81053 |
| $N_2$ | 0.068737 | 0.086845 | 0.098242 | 0.114456 | 0.124253 | 0.137422 |
| ReD/L | 5.74055 | 7.42813 | 8.51601 | 10.19113 | 11.30019 | 13.02123 |

TABLE 10-continued

Data for the Compensated Q/ΔP vs. ReD/L model in FIGS. 10 and 11.

| | | | | | | |
|---|---|---|---|---|---|---|
| $CO_2$ | 0.089392 | 0.111324 | 0.123824 | 0.141947 | 0.152328 | 0.166409 |
| ReD/L | 3.09731 | 4.06302 | 4.70595 | 5.67947 | 6.31455 | 7.27673 |
| $CH_4$ | 0.051484 | 0.066024 | 0.075231 | 0.088724 | 0.096946 | 0.109048 |
| ReD/L | 6.37948 | 8.24306 | 9.48906 | 11.34077 | 12.62402 | 14.63929 |
| $CHF_3$ | 0.097551 | 0.120612 | 0.134701 | 0.152687 | 0.163699 | 0.177905 |
| ReD/L | 5.73702 | 7.41548 | 8.54473 | 10.23901 | 11.38745 | 13.12534 |
| $CF_4$ | 0.089209 | 0.110614 | 0.124084 | 0.142214 | 0.153174 | 0.166787 |
| ReD/L | 6.77434 | 8.69069 | 9.96469 | 11.93736 | 13.27830 | 15.43129 |
| $SF_6$ | 0.103622 | 0.125926 | 0.139127 | 0.157590 | 0.168128 | 0.182511 |

Having thus described several aspects of at least one embodiment of this invention, it is to be appreciated various alterations, modifications, and improvements will readily occur to those skilled in the art. Indeed, the invention can be implemented to upgrade existing or field-installed flow sensors or flow control devices to incorporate any one or more aspects of the invention thereby retrofitting facilities comprising such units. Such alterations, modifications, and improvements are intended to be part of this disclosure, and are intended to be within the scope of the invention. Accordingly, the foregoing description and drawings are by way of example only.

What is claimed is:

1. A fluid flow controller comprising:
a flow sensor comprising a bypass with a plurality of bypass tubes, a sensor conduit in fluid communication with the bypass, a sensor assembly operatively coupled to the sensor conduit to generate a measured signal representative of a flow rate of a fluid through the sensor conduit;
a processor operatively configured to receive the measured signal and to generate a flow rate representation based at least partially on the measured signal and a characteristic function of the flow sensor, the characteristic function at least partially defined by a dynamic pressure of fluid flowing through the bypass; wherein the characteristic function is represented by a relationship defined during calibration of the flow sensor at a plurality of flow rates with at least one calibration fluid:

$$\frac{Q}{\Delta P} = G\left(Re\frac{D}{L}\right);$$

where
Q is a dynamic pressure of a bypass of the flow sensor,
ΔP is the overall pressure differential,
Re is a Reynolds number of the fluid flowing through the bypass,
D is the inside diameter of bypass tubes in the bypass, and
L is the length of the bypass tubes; and
a flow regulator fluidly connected to the flow sensor and configured to receive a control signal from the processor that is at least partially based on the flow rate representation and a desired fluid flow.

2. The fluid flow controller of claim 1, wherein the characteristic function is further based on a bypass bias function, $F_B$, defined by the relationship:

$$F_B = (a_0 + a_1 X + a_2 X^2 + a_3 X^3)$$

where $$X = Re\frac{D}{L},$$

and where $a_0$, $a_1$, $a_2$, and $a_3$ are bypass bias function coefficients defined using at least one calibration fluid during calibration of the flow controller.

3. A fluid flow controller comprising:
a control valve and a flow sensor, the flow sensor having a bypass that includes a plurality of bypass tubes;
a sensor conduit fluidly connected to the bypass;
the flow sensor operatively configured to generate a measured signal representative of a flow rate of the fluid through the sensor conduit;
a processor operatively configured to generate a representation of the flow rate of the fluid through the flow sensor based at least partially on the measured signal, one or more sensor attributes, one or more fluid properties, and a characteristic function according to the relationship:

$$\frac{Q}{\Delta P} = G\left(Re\frac{D}{L}\right)$$

where Q is a bypass dynamic pressure, ΔP is the overall pressure differential, Re is a Reynolds number of the fluid flowing through the bypass, D is the inside diameter of the bypass tubes, and L is the length of the tubes; and
a flow regulator operatively configured to receive a control signal from the processor to adjust a flow rate of the fluid through a control valve based at least partially on the representation of the flow rate of the fluid and a desired flow rate through the flow controller.

4. The fluid flow controller of claim 3, wherein the characteristic function is further based on a bypass bias function, $F_B$, defined by the relationship:

$$F = (a_0 + a_1 X + a_2 X^2 + a_3 X^3)$$

where $$X = Re\frac{D}{L},$$

and where $a_0$, $a_1$, $a_2$, and $a_3$ are bypass bias function coefficients defined using at least one calibration fluid during calibration of the flow controller.

5. The fluid flow controller of claim 3, wherein the fluid is not a calibration fluid utilized to generate the characteristic function.

6. A fluid flow controller comprising:
a flow sensor assembly that includes a bypass and a flow sensor, the bypass having a plurality of bypass tubes, the flow sensor operatively configured to measure a plurality of flow rates of a calibration fluid flowing through the flow sensor;
a processor operatively configured to:
generate a plurality of adjusted dynamic pressure attributes corresponding to each of the plurality of measured flow rates of the calibration fluid; and
generate the characteristic function based at least partially on the plurality of adjusted dynamic pressure attributes and at least one physical attribute of the flow sensor for generating a characteristic function for the flow sensor.

7. The fluid flow controller of claim 6, wherein the act of generating the plurality of adjusted dynamic pressure attributes comprises measuring a pressure differential across the flow sensor for each of the plurality of flow rates and generating a plurality of dynamic pressure values for each of the plurality of flow rates.

8. The fluid flow controller of claim 7, wherein the act of generating the plurality of adjusted dynamic pressure attributes, $(Np)_i$, comprises calculating, for each of the plurality of flow rates, the function:

$$(Np)_i = \frac{\frac{1}{2}(\rho U^2)}{\Delta P}$$

where
$\Delta P$ is the pressure differential across the flow sensor of the calibration fluid, $\rho$ is the density of the calibration fluid, and
U is the mean velocity of the calibration fluid flowing through the bypass.

9. The fluid flow controller of claim 8, further comprising the processor generating a plurality of adjusted flow attributes corresponding to each of the plurality measured flow rates of the calibration fluid.

10. The fluid flow controller of claim 9, wherein the act of generating the plurality of adjusted flow attributes, $(Nf)_i$, comprises calculating, for each of the plurality of flow rates, the function:

$$(Nf)_i = Re\frac{D}{L}$$

where Re is a Reynolds number of a fluid flowing through the bypass, D is the inside diameter of the bypass tubes, and L is the bypass tube length.

11. The fluid flow controller of claim 10, wherein the fluid flowing through the bypass is different from the calibration fluid utilized to generate the characteristic function.

12. The fluid flow controller of claim 6, further comprising the processor measuring a plurality of output values corresponding to the plurality of flow rates of the calibration fluid.

13. The fluid flow controller of claim 12, further comprising the processor generating a calibration curve based on the plurality of output values and the characteristic function.

14. The fluid flow controller of claim 6, wherein the characteristic function is defined by the relationship:

$$\frac{Q}{\Delta P} = G\left(Re\frac{D}{L}\right)$$

where Q is the bypass dynamic pressure, $Q=0.5(\rho U^2)$, $\Delta P$ is a pressure differential across the flow sensor, $\rho$ is the density of the calibration fluid, and U is the mean velocity of the calibration fluid flowing through the bypass, Re is a Reynolds number of a fluid flowing through the bypass, D is the inside diameter of the bypass tubes, and L is the bypass tube length.

15. A fluid flow controller comprising:
a flow sensor that includes at least one bypass tube; the flow sensor operable to receive a calibration gas at a plurality of flow rates;
a processor operatively configured to:
determine a first dimensionless parameter based at least partially on a dynamic pressure value of the calibration gas flowing through the bypass for each of the plurality of flow rates;
determine second dimensionless parameter based at least partially on a diameter to length aspect ratio of the bypass for each of the plurality of flow rates; and
map the first dimensionless parameter as a function of the second dimensionless parameter for generating a calibration curve for the flow sensor.

16. The fluid flow controller of claim 15, wherein the first dimensionless parameter is defined by the ratio of the product of one half of the density of the calibration gas and the square of the mean flow velocity to the measured overall pressure differential.

17. The fluid flow controller of claim 16, wherein the second dimensionless parameter is defined by a product of the Reynolds number of the calibration gas flowing through the bypass and the aspect ratio of the bypass.

18. The fluid flow controller of claim 17, wherein the processor is further operatively configured to:
determine a plurality of first and second dimensionless numbers corresponding to each of the plurality of flow rates; and
map each of the corresponding first and second dimensionless numbers to generate the calibration curve.

19. The fluid flow controller of claim 18, wherein the processor is further operatively configured to generate a bypass bias function based on the plurality of corresponding first and second dimensionless numbers.

* * * * *

UNITED STATES PATENT AND TRADEMARK OFFICE
CERTIFICATE OF CORRECTION

PATENT NO. : 8,010,303 B2
APPLICATION NO. : 12/578296
DATED : August 30, 2011
INVENTOR(S) : Chiun Wang et al.

Page 1 of 1

It is certified that error appears in the above-identified patent and that said Letters Patent is hereby corrected as shown below:

At column 26, claim number 4, line number 54, the equation is hereby replaced with the following: $$F_B = \left(a_0 + a_1 X + a_2 X^2 + a_3 X^3\right)$$

Signed and Sealed this
Sixth Day of December, 2011

David J. Kappos
*Director of the United States Patent and Trademark Office*